United States Patent
Pippins

(10) Patent No.: US 12,076,822 B2
(45) Date of Patent: Sep. 3, 2024

(54) WELDING TRACKING AND/OR MOTION SYSTEM, DEVICE AND/OR PROCESS

(71) Applicant: T Bailey, Inc., Anacortes, WA (US)

(72) Inventor: Jeffrey J. Pippins, Oak Harbor, WA (US)

(73) Assignee: T BAILEY, INC., Anacortes, WA (US)

( * ) Notice: Subject to any disclaimer, the term of this patent is extended or adjusted under 35 U.S.C. 154(b) by 422 days.

(21) Appl. No.: 17/023,092

(22) Filed: Sep. 16, 2020

(65) Prior Publication Data

US 2022/0080519 A1    Mar. 17, 2022

(51) Int. Cl.
B23K 9/095    (2006.01)
B23K 9/127    (2006.01)

(52) U.S. Cl.
CPC .......... B23K 9/0953 (2013.01); B23K 9/0956 (2013.01); B23K 9/1274 (2013.01)

(58) Field of Classification Search
CPC ........ B23K 9/09; B23K 9/095; B23K 9/0956; B23K 9/10; B23K 9/12; B23K 9/1274; G05B 2219/37127; G05B 2219/37212; G05B 2219/45104; G05B 2219/45135; G05B 2219/45138
See application file for complete search history.

(56) References Cited

U.S. PATENT DOCUMENTS

| | | | |
|---|---|---|---|
| 6,064,759 A * | 5/2000 | Buckley | G01B 11/024 348/125 |
| 6,084,195 A | 7/2000 | Swaggerty et al. | |
| 6,459,062 B1 | 10/2002 | Guerrina | |
| 7,577,285 B2 * | 8/2009 | Schwarz | B23K 9/0956 348/90 |
| 9,465,129 B1 * | 10/2016 | Olsson | G01V 3/15 |
| 2003/0015501 A1 | 1/2003 | Nastasi | |
| 2004/0112874 A1 * | 6/2004 | Nastasi, Jr. | B23K 11/252 219/109 |
| 2004/0195214 A1 | 10/2004 | Sun et al. | |
| 2006/0212170 A1 * | 9/2006 | Nagatsuka | G05B 19/4207 700/245 |
| 2009/0161827 A1 * | 6/2009 | Gertner | A61N 5/1017 378/65 |
| 2009/0237668 A1 * | 9/2009 | Reyes, Jr. | G01S 7/4802 356/445 |
| 2010/0206938 A1 * | 8/2010 | Quandt | G05B 19/4083 228/102 |
| 2011/0006047 A1 * | 1/2011 | Penrod | G09B 25/02 434/234 |

(Continued)

FOREIGN PATENT DOCUMENTS

| | | | | |
|---|---|---|---|---|
| AU | 2019217205 A1 * | 9/2020 | | G06K 9/00624 |
| CN | 110517221 A * | 11/2019 | | G06T 7/0004 |

(Continued)

OTHER PUBLICATIONS

Machine translation of DE-102007035485-A1 (Year: 2024).*

(Continued)

*Primary Examiner* — Geoffrey S Evans
(74) *Attorney, Agent, or Firm* — Berkeley Law & Technology Group, LLP

(57) ABSTRACT

Briefly, the present disclosure relates generally to welding applications and, more particularly, to welding tracking and/or motion systems.

18 Claims, 12 Drawing Sheets

(56) References Cited

U.S. PATENT DOCUMENTS

| | | | |
|---|---|---|---|
| 2013/0180965 A1 | 7/2013 | Komatsu | |
| 2016/0107258 A1* | 4/2016 | Denis | B23K 9/1087 |
| | | | 2/8.2 |
| 2016/0175964 A1* | 6/2016 | Penoyer | B23K 9/0956 |
| | | | 219/137 R |
| 2016/0214198 A1* | 7/2016 | Hsu | G01C 25/00 |
| 2016/0267806 A1* | 9/2016 | Hsu | B23K 9/0956 |
| 2017/0046975 A1* | 2/2017 | Becker | G09B 19/003 |
| 2018/0117718 A1* | 5/2018 | Rajagopalan | B23K 9/0284 |
| 2018/0130376 A1* | 5/2018 | Meess | B23K 9/322 |
| 2020/0043366 A1* | 2/2020 | Schneider | G09B 9/00 |
| 2020/0070281 A1* | 3/2020 | Takeda | B23K 26/032 |
| 2020/0246903 A1* | 8/2020 | Radighieri | B23K 9/127 |

FOREIGN PATENT DOCUMENTS

| | | | | |
|---|---|---|---|---|
| DE | 102007035485 A1 * | 1/2009 | | B23K 26/046 |
| DE | 102017201730 A1 * | 8/2018 | | B23K 26/03 |
| EP | 1849553 A1 * | 10/2007 | | B23K 26/0884 |
| GB | 2553433 A * | 3/2018 | | B21J 15/28 |
| KR | 2009006343 A * | 1/2009 | | |

OTHER PUBLICATIONS

Machine translation of KR-20090006343-A1 (Year: 2024).*

Machine translation of De 102017201730-A1 (Year: 2024).*

Notification of Transmittal of the International Search Report and the Written Opinion of the International Searching Authority, or the Declaration, App. No. PCT/US21/49734, Mailed Dec. 23, 2021, 15 Pages.

Office Action, App. No. TW110134519, Dated Aug. 10, 2022, 9 Pages.

Response to Office Action, App. No. TW110134519, Filed Sep. 2, 2022, 143 Pages.

Notice of Allowance, App. No. TW110134519, Dated Nov. 18, 2022, 2 Pages.

* cited by examiner

WELDING TRACKING AND/OR MOTION SYSTEM, DEVICE AND/OR PROCESS

BACKGROUND

1. Field

The present disclosure relates generally to welding systems and/or processes and, more particularly, to welding tracking and/or motion systems and/or processes.

2. Information

In the welding industry, laser seam tracking systems are prevalent. However, such systems may be costly to acquire and/or maintain, thereby putting the technology out of reach of many businesses and/or individuals. Further, such systems may be relatively unreliable. For example, laser seam tracking systems may include a camera and a laser and/or may operate on a basis of triangulation. One example challenge in operating and/or maintaining such a tracking system is that of maintaining satisfactory alignment. Complicating the issue of maintaining satisfactory alignment is that such tracking systems may tend to be employed in relatively harsh environments. For example, a relatively small bump may knock a system out of alignment, thereby resulting in down time until the system can be re-aligned. Further, tracking systems may work in connection with motion systems in some instances. Integration of tracking systems and/or motion systems may provide its own set of challenges, thereby resulting in additional issues related to costs and/or reliability, for example.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
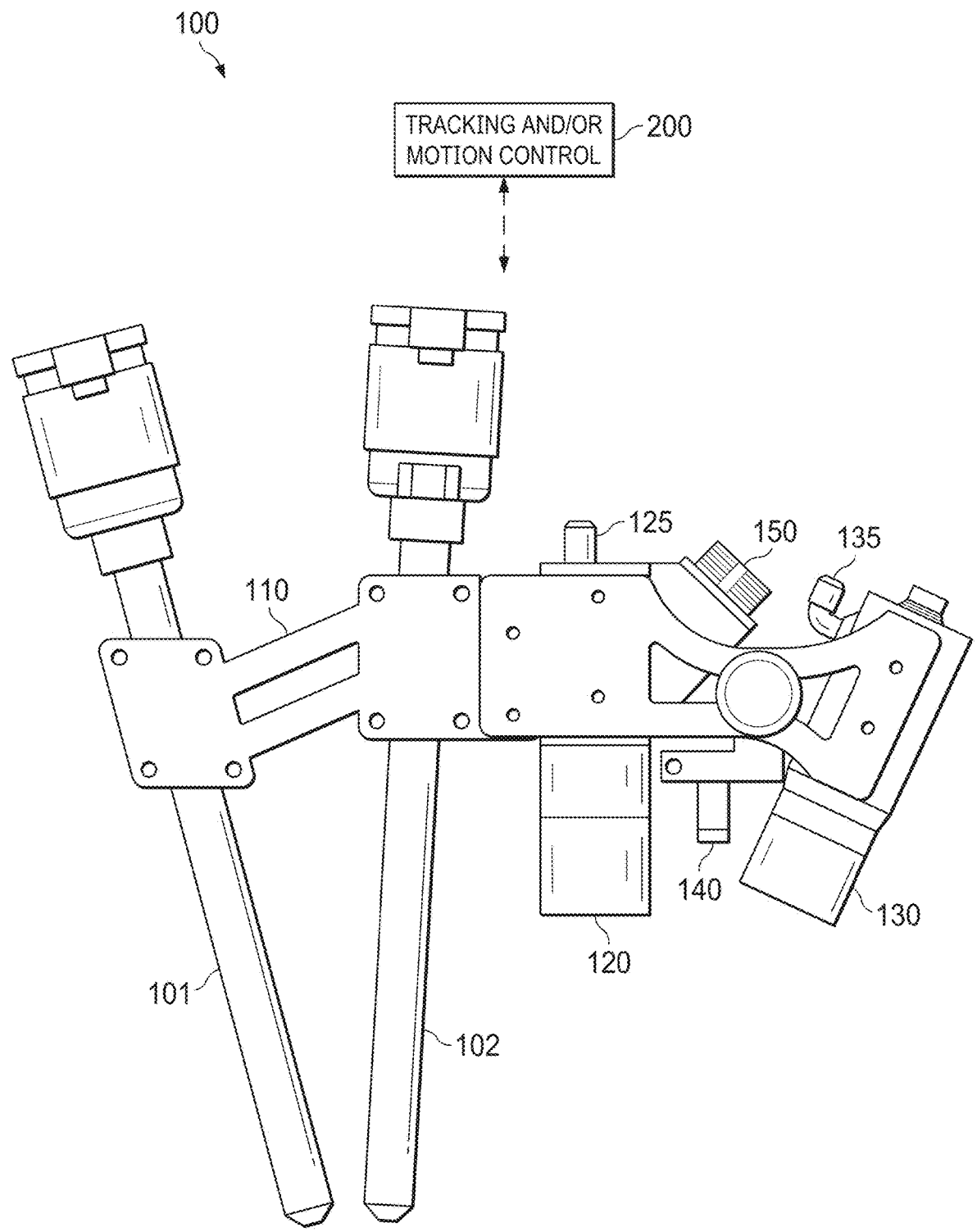
FIG. 1 is a schematic diagram illustrating an example welding system assembly, in accordance with an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc. may be omitted, such as for ease of discussion, or the like. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

As mentioned, in the welding industry, laser seam tracking systems are prevalent. However, such systems may be costly to acquire and/or maintain, thereby putting the technology out of reach of many businesses and/or individuals. Further, such systems may be relatively unreliable. For example, laser seam tracking systems may include, for example, a camera and a laser, and/or may operate on a basis of triangulation, for example. One example challenge in operating and/or maintaining such a tracking system is that of maintaining satisfactory alignment. Complicating the issue of maintaining satisfactory alignment is that such tracking systems may tend to be employed in relatively harsh environments. For example, a relatively small bump may knock a system out of alignment, thereby resulting in down time until the system can be re-aligned. Further, tracking systems may work in connection with motion systems in some instances. Integration of tracking systems and/or motion systems may provide its own set of challenges, thereby resulting in additional issues related to costs and/or reliability, for example.

In some circumstances, some welding tracking systems may perform calibration based at least in part on a starting reference point. However, in some circumstances, materials undergoing a welding operation may tend to move during operation. For example, an item, such as a relatively large tank, perhaps several tens of feet in diameter, may undergo deformation (e.g., flexing, torsion, etc.) during an operation to weld a seam, for example, due to forces exerted and/or exhibited in working with items that may be relatively massive, for example. A system basing its calibration off of a starting reference point may exhibit difficulties in maintaining alignment (e.g., alignment of welding equipment with a joint and/or seam) as the item undergoes deformation, and/or otherwise shifts position during a welding operation, for example. Of course, there may be any number of factors that may cause a welding system to fall out of alignment.

Also, in some circumstances, some commercially available welding systems may be relatively complex in terms of operation. For example, in some circumstances, systems may include features that may rarely be utilized, but that may nonetheless add complexity, thereby contributing to increased costs, reduced reliability and/or decreased ease-of-operation.

To address these or like issues and/or challenges, for example, various approaches comprising non-limiting example embodiments and/or implementations, such as described herein, may be employed, in whole or in part. For example, as will be seen, an embodiment of a welding tracking and/or motion system may perform calibration operations in real-time (e.g., without undue delay), such as during welding operations. For example, in an implementation, a tracking and/or motion system may detect feature points on a surface of a material to be welded. In an implementation, a calibration operation may be performed wherein known parameters may be obtained via a small movement (e.g., too small to negatively impact weld) performed by a tracking and/or motion system. Calibration operations may be performed at least in part in response to a detection by a tracking and/or motion system of a misalignment, in an implementation. For example, to detect a misalignment, a tracking and/or motion system may determine that a difference between a set of predicted feature point locations and a set of detected feature point locations exceeds a specified threshold value. In an implementation, known parameters (e.g., parameters derived from a specified movement) may be utilized at least in part to calculate a transform for calibration operations. Embodiments, including example implementations described herein, for example, may address, at least in part, cost and/or reliability issues and/or other challenges mentioned above while improving ease-of-use, as explained more fully below.

FIG. 1 is a schematic diagram illustrating an embodiment 100 of an example welding system assembly. Assembly 100, for example, may include welding equipment, such as wire feeders 101 and/or 102. Assembly 100 may also include other welding equipment such as power supplies and/or other components that are not depicted and/or described herein for purposes of clarity of explanation. In an implementation, as illustrated, wire feeders 101 and/or 102 may, for example, be mounted in a tandem configuration by way of a mount 110. Mount 110 may further provide structural support for a camera 120 and/or a laser 130, in an implementation. Mount 110 may also provide a physical connection to an embodiment 200 of an example tracking and/or motion control system, for example. In an implementation, mount 110 may comprise, such as be manufactured out of, any suitable material, such as plastic. For example, mount 110 may be 3-D printed, although claimed subject matter is not limited in scope in these respects. In an implementation, tracking and/or motion control system 200 may induce particular movement in wire feeders 101 and/or 102, camera 120 and/or laser 130 as a whole due, at least in part, to wire feeders 101 and/or 102, camera 120 and/or laser 130 being physically coupled as an assembly (e.g., assembly 100) via mount 110. By exerting various forces on mount 110, tracking and/or motion control system 200 may impart one or more particular movements on assembly 100, as described more fully below.

Figure 18:
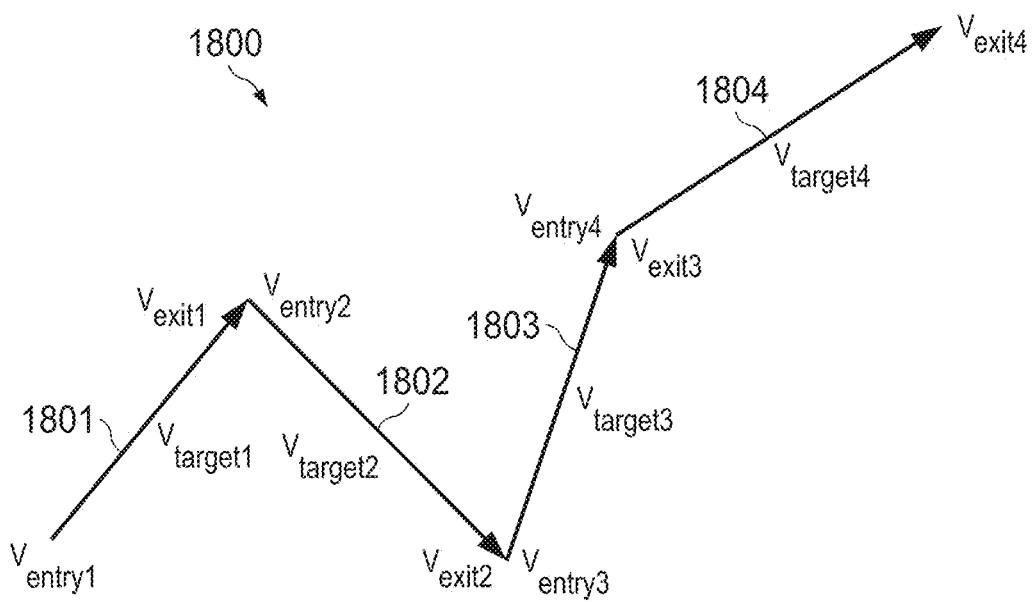
FIG. 18 is an illustration depicting an example chart showing example movements for an example tracking and/or motion control system.

In an implementation, assembly 100 may further include a laser pointer 140 and/or a viewfinder 150. Additionally, in an implementation, assembly 100 may include air inlets 125 and/or 135. For example, a compressed air supply system (not depicted) may be coupled to air inlets 125 and/or 135. In an implementation, air delivered to air inlet 125 may flow through a housing for camera 120 to provide cooling for camera 120. Further, in an implementation, air delivered to air inlet 125 may flow across a lens for camera 120 to keep the lens clean. FIG. 18 depicts an example camera assembly, which will be discussed in more detail below. Further, air delivered to air inlet 135 may flow through a housing for laser 130 to provide cooling, for example.

In an implementation, camera 120 may comprise a digital camera that may generate digital image content for use by tracking and/or motion control system 200. In an implementation, digital image content, such as signals and/or signal packets comprising sets of digital image parameters, may be communicated between camera 120 and tracking and/or motion control system 200 via a wired and/or wireless communication link. For example, camera 120 may be communicatively coupled to tracking and/or motion control system 200, such as via a CAT6/IPG7 port. See FIG. 19, for example. Camera 120 may also be fitted with an optical filter, such as to reduce light pollution. For example, in an implementation, laser 130 may generate a light with a 650 nm wavelength. Also, in an implementation, a bandpass optical filter for camera 120 may comprise a 650 nm bandpass filter to reduce and/or eliminate light that varies from the 650 nm wavelength. Of course, claimed subject matter is not limited in scope in these respects.

Figure 2:
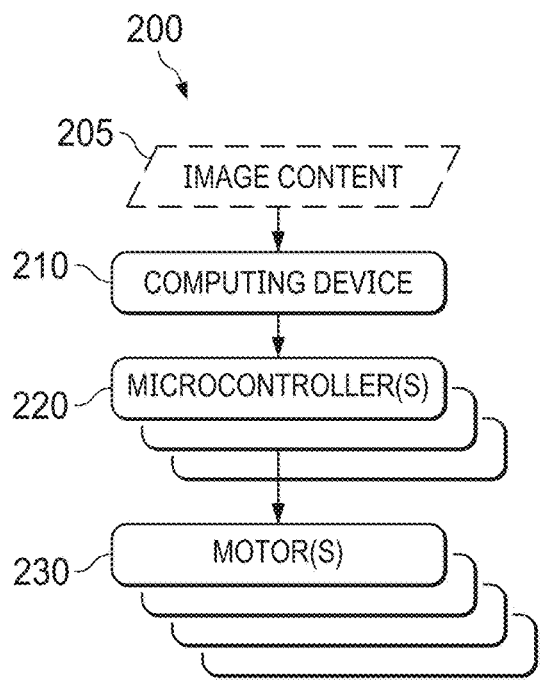
FIG. 2 is a schematic block diagram illustrating an example welding tracking and/or motion system, in accordance with an embodiment.

FIG. 2 is a schematic block diagram illustrating an example embodiment tracking and/or motion control system 200. In an implementation, tracking and/or motion control system 200 may include one or more computing devices 210, one or more microcontrollers 220 and/or one or more motors 230. In an implementation, computing device 210 may include and/or may execute a Microsoft Windows operating system. Other example operating systems may include a variety of now known and/or to be developed operating systems, derivatives and/or versions thereof, including computer operating systems, such as iOS, Linux, a mobile operating system, such as iOS, Android, Windows Mobile, and/or the like. Computing device 210 may also, in an implementation, include and/or may execute a variety of possible software and/or firmware applications, such as one or more applications designed to implement any combination of the various example techniques, approaches, processes and/or the like for tracking and/or motion control, for example, described herein.

In an implementation, microcontrollers 220 may comprise one or more processors, such as based at least in part on an ARM Cortex-5 architecture, for example. In a particular implementation, three microcontrollers may be employed, although claimed subject matter is not limited in scope in this respect. As described more fully below, computing device 210 and/or microcontroller(s) 220 may be employed to execute computer-readable code and/or instructions to implement applicable techniques, approaches and/or processes described herein, including various tracking and/or motion control operations, for example. Further, in an implementation, tracking and/or motion control system 200 may also include one or more motors 230. For example, motors 230 may comprise step motors. As explained more fully below, motors 230 may receive signals and/or signal packets from one or more microcontrollers 220 to execute one or more particular movements of assembly 100, for example. In an implementation, one or more microcontrollers 220 may be employed to help ensure real-time signaling and/or driving of motors 230. In an implementation, computing device 210, microcontrollers 220 and/or motors 230 may communicate via one or more wired and/or wireless communication approaches and/or protocols, such as one or more communication approaches and/or protocols described herein.

In an implementation, one or more microcontrollers 220 may act as translators between computing device 210 and various welding equipment, such as one or more power supplies and/or one or more wire feeders, such as wire feeders 101 and/or 102. For example, tracking and/or motion control system 200 may analyze a weld joint. In an implementation, alterations to one or more weld settings may be made at least in part in response to a weld joint analysis. Weld engineers, process managers and/or other operators may control weld settings through a dedicated web portal, for example. A capability to set and/or alter weld settings "on the fly" in response to real-time (e.g., without added and/or undue delay) measurements and/or analysis may help reduce weld failures and/or may help reduce an amount of rework that may need to be performed. Thus, efficiencies may be increased and/or profits may rise.

Additionally, tracking and/or motion control system 200 may also include a display device. For example, in an implementation, a 7.0" liquid crystal display (LCD) may be provided. Tracking and/or motion control system 200 may also include a joystick, for example. Through utilization of third-party control devices, such as a standard gaming joystick, for example, training time and/or control device replacement costs may be reduced. However, claimed subject matter is not limited in scope in these respects. Haptic feedback devices may also be employed, such as to provide vibrations to warn an operator and/or welder of an issue, in an implementation.

Figure 3:
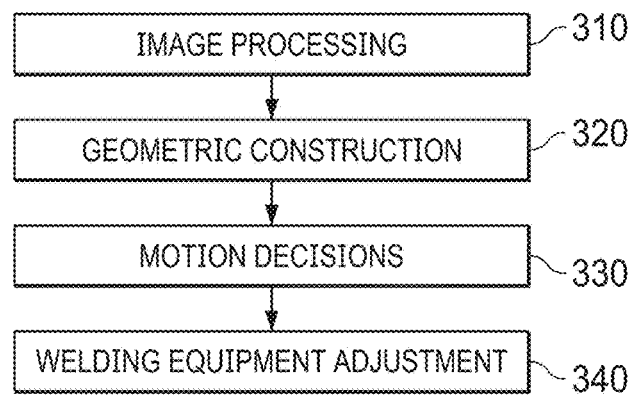
FIG. 3 depicts a flow diagram illustrating an example process for tracking and/or motion control for a welding device, in accordance with an embodiment.

FIG. 3 depicts a flow diagram illustrating an embodiment 300 of an example process for tracking and/or motion control for a welding device, such as assembly 100. As depicted in FIG. 2, tracking and/or motion control system 200 may obtain image content 205 that may include signals and/or signal packets representative of sets of image parameters. For example, image content 205 may comprise sets of parameters representative of one or more still images or may comprise sets of parameters representative of video content, or a combination thereof. In an implementation, image content 205 may comprise signals and/or signal packets representative of a set of parameters comprising a particular frame of video and/or still image content. In an implementation, image content 205 may be obtained from camera 120 during welding operations. In an implementation, tracking and/or motion control system 200 may process image content 205 and/or may initiate adjustments to welding equipment, such as assembly 100, for example, based at least in part on operations performed on image content 205. It should be noted that content acquired or produced, such as, for example, input signals, output signals, operations, results, etc. associated with example process 300 may be represented via one or more digital signals. It should also be appreciated that even though one or more operations are illustrated or described concurrently or with respect to a certain sequence, other sequences or concurrent operations may be employed. In addition, although the description below references one or more particular aspects and/or features illustrated in certain other figures, one or more operations may be performed with other aspects and/or features.

As was indicated, image content 205 may be obtained from camera 120 during welding operations. As referenced generally at operation 310, image content may be processed using various approaches, in an implementation. For example, image content 205 may be processed, such as to reduce noise, determine line centers, etc., Aspects related to image processing are discussed more fully below, such as in connection with FIG. 4 and/or FIGS. 7-11, for example. Further, in an implementation, geometric entities may be constructed and/or otherwise determined from filtered image content, as depicted generally at operation 320. For example, line segments may be detected, surface heights may be determined, and/or tracking points may be determined, to list a few possible non-limiting examples. Geometric construction is discussed more fully below, such as in connection with FIG. 5 and/or FIGS. 12-14, for example.

Based at least in part on geometric entities constructed at operation 320, for example, motion decisions may be determined, as indicated generally at operation 330. For example, various movement commands may be generated based, at least in part, on geometric parameters and/or on one or more particular dynamic motion situations, in an implementation. Additionally, adjustments to welding equipment, such as assembly 100, may be made at operation 340 based at least in part on movement commands generated at operation 330, in an implementation. Motion decision operations and/or adjustments to welding equipment are discussed more fully below, such as in connection with FIGS. 6 and 15-18, for example.

Figure 4:
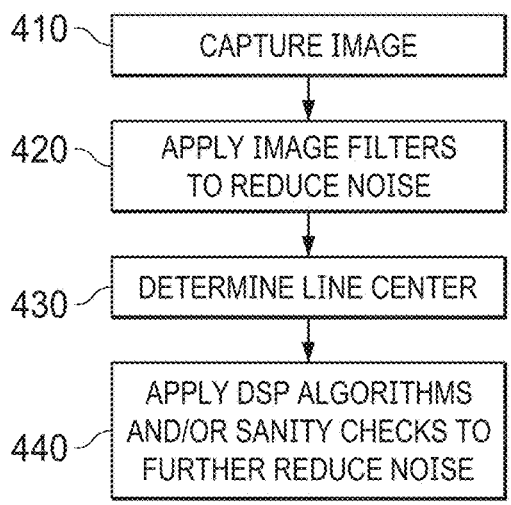
FIG. 4 depicts a flow diagram illustrating an example implementation for processing image content for an example welding tracking and/or motion system, in accordance with an embodiment.

FIG. 4 depicts a flow diagram illustrating an embodiment 400 of an example process for processing image content. As was indicated, image processing may include noise reduction operations and/or operations, such as to detect and/or otherwise determine line centers, for example. Image processing may also include various digital signal processing (DSP) operations and/or other sanity check operations, such as to further reduce noise, for example. It should be noted that content acquired or produced, such as, for example, input signals, output signals, operations, results, etc. associated with example process 400 may be represented via one or more digital signals. It should also be appreciated that even though one or more operations are illustrated or described concurrently or with respect to a certain sequence, other sequences or concurrent operations may be employed. In addition, although the description below references one or more particular aspects and/or features illustrated in certain other figures, one or more operations may be performed with other aspects and/or features.

Figure 7:
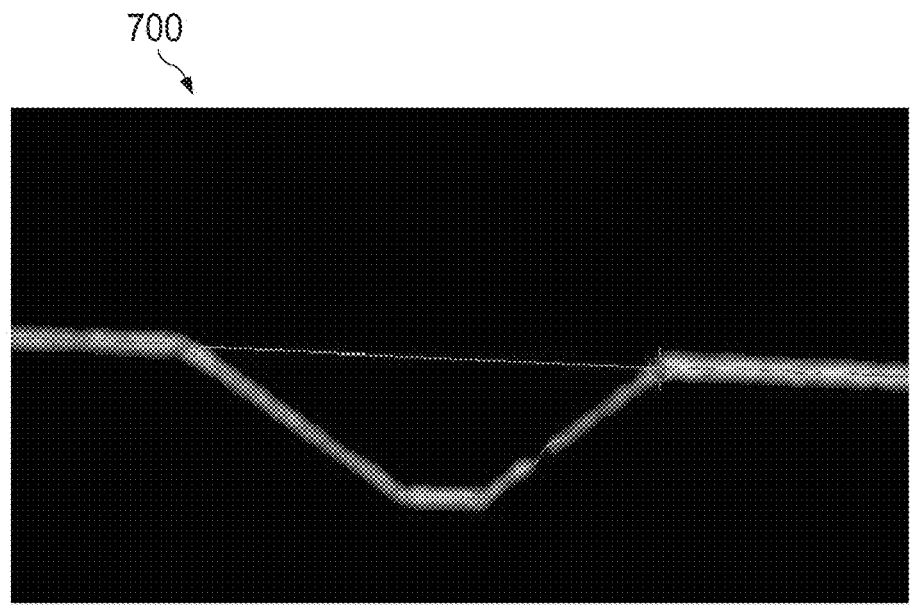
FIG. 7 is an illustration depicting an example image of an example weld seam, in accordance with an embodiment.

As indicated generally at 410, and as was indicated above, image content may be captured by camera 120, for example. See, for example, FIGS. 7-10, discussed more fully below, for example images. In an implementation, image content may be captured and/or processed on a frame-by-frame basis. For example, image content may comprise arrays of parameters representative of pixel values for respective captured frames. Thus, in an implementation, filtering operations, for example, may be performed on individual frames of image content. At camera 120, light may pass through a bandpass filter, such as a 650 nm bandpass filter, for example. A bandpass filter at camera 120 may help filter out undesirable light as the light passes through a lens and into the camera for capture. Thus, in an implementation, an operation to capture image content, such as operation 410, may also include one or more levels of filtering, such as filtering that may occur as light passes through a physical bandpass filter. Further, as indicated previously, captured image content may be communicated between camera 120 and tracking and/or motion control system 200. FIG. 7, discussed more fully below, depicts an example image 700 of a weld seem.

Additionally, in an implementation, example process 400 may proceed to operation 420, wherein one or more noise filtering operations may be performed on captured image content. In many circumstances, a welding environment may be a relatively noisy environment. For example, potential sources of noise from a perspective of a camera image may include light pollution and/or electrical noise. Electrical noise may be reduced through suitable grounding and/or shielding approaches for signal lines, such as CAT6 cables and/or the like that may carry electrical signals and/or signal packets between camera 120 and computing device 210, for example. In an implementation, reduction of light pollution may be achieved at least in part via image processing filters and/or image parameter reconstruction approaches. Image filtering and/or image parameter reconstruction operations, for example, may be implemented in hardware, software and/or firmware, or any combination thereof. For example, image filtering operations may be performed at computing device 210 and/or microcontroller(s) 220 via execution of computer-executable code or instructions designed to implement one or more particular image filtering operations.

In an implementation, a sanity check may be performed on captured image content, such as to determine whether an image has been overexposed. For example, one or more pixel values may be electronically checked to determine whether a specified pixel intensity threshold value has been exceeded. In an implementation, a pixel intensity threshold value may be determined at least in part in substantially real-time. For example, an autonomous process may be implemented to determine a threshold value that may result in a reliable sanity check. In an implementation, a pixel intensity threshold value may be determined at least in part via an examination of total image intensities of individual columns of pixels within a particular image. Comparisons of individual column intensity profiles to a known Gaussian pixel intensity distribution may be performed until an appropriate pixel intensity threshold value is determined, for example.

In an implementation, at least in part in response to a determination that an image has been overexposed, operation 420 may ignore a current image frame and/or may wait for a next image frame. Further, in an implementation, a gaussian blurring filter operation may be performed on image content. For example, a blurring filter may act as a specular filter for a laser beam. A blurring filter may help isolate diffused reflections and/or may fill in any speckle, in an implementation. Also, in an implementation, a resulting blurred image may include a more uniform hot spot where diffused reflections may be at an increased intensity as compared to the rest of the image. A blur filter may also blend out speculation at edges of a laser line, for example. Also, for example, a non-uniform distribution may be attributed to differences in reflective properties of a metal surface being welded.

In an implementation, an isolated blob filter may be applied to image content. As utilized herein, an "isolated blob filter" (IBF) refers to an image filtering process whereby light pollution that may be detected as isolated blurry islands of light within a frame may be reduced and/or removed. In a welding environment, arc flashes may contribute to a type of light pollution that may effectively be reduced via application of an IBF. IBFs are described more fully below in connection with FIGS. 7-11.

Further, in an implementation, a gaussian intensity distribution filter may be applied to image content, such as to further reduce and/or eliminate light pollution. Lasers may have one or more particular properties as compared with other light sources. For example, lasers are composed of a single wavelength. Also, for example, the intensity of laser light may be suitably modeled by a specific gaussian distribution. Thus, in an implementation, a light source that does not meet a specified gaussian intensity distribution of a particular laser line. For example, an array of image parameters (e.g., representative of pixel values) may be scanned, such as on a column-by-column basis, to analyze consecutive intensity values. In an implementation, at least in part responsive to an intensity distribution for a particular cluster of parameters matching a specified gaussian distribution, the particular cluster of parameters may be maintained in the array. Otherwise, for example, the particular cluster of parameters may be removed from the array.

In some circumstances, after filtering image content in accordance with one or more of the example approaches mentioned above, an image frame may still have noise. Thus, in an implementation, an intensity threshold filter may be applied. For example, an intensity threshold filter may remove image parameters (e.g., pixel values) that do not meet a specified threshold intensity value. A potential benefit of an intensity threshold filter is that of reducing overhead for subsequent image processing and/or other operations. For example, the fewer pixels to be processed, the faster computing device 210, for example, may process them.

At least in part responsive to image processing performed at operation 420, example process 400 may proceed to operation 430. As generally indicated at 430, an operation to determine a center of line, such as a laser line contained in a frame of image content, may be performed. In an implementation, a laser line may appear in an image as a relatively thick fuzzy line. Example operation 430 may include capturing and/or isolating a fuzzy line in its entirety and/or to a suitable degree, in an implementation.

Within an image, a laser line may appear as continuous sections of a predictable shape. In an implementation, process 430 may match continuous columns and/or breaks in continuity. At least in part responsive to extracting and/or otherwise isolating a line from an image, a center of the line may be determined for individual pixel columns, in an implementation. For example, a weighted average may be calculated. In an implementation, intensity values for individual columns of pixels may be utilized, at least in part, as weight values, and/or a resulting value may yield a row value of sub pixel accuracy. A set of such row values corresponding to the various columns of a frame of image content may yield an array of parameters representative of a laser line, for example.

As indicate generally at 440, one or more sanity checks and/or other DSP operations may be performed on an array of parameters representative of a laser line, for example. In an implementation, an array of parameters representative of a laser line may be checked for continuity. For example, if a laser line is laying on top of a weld joint, an array of parameters representative of a laser line may comprise a continuous set of parameters. In an implementation, continuity testing may be performed at least in part by calculating first and/or second derivatives of a detected line and comparing them to specified values.

Figure 5:
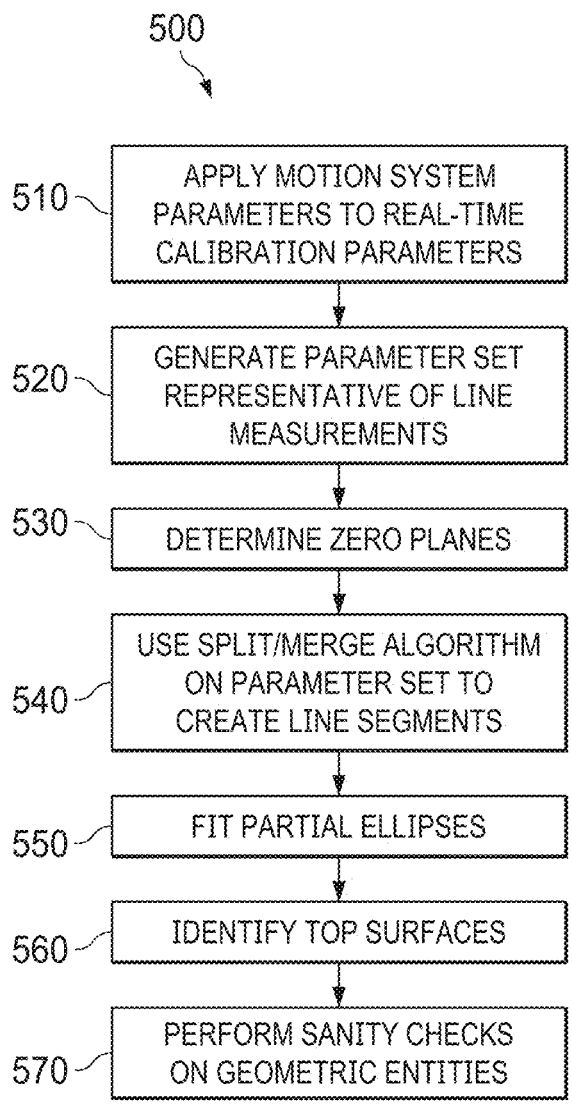
FIG. 5 depicts a flow diagram illustrating an example process for identifying geometric parameters from image content for an example welding tracking and/or motion system, in accordance with an embodiment.

FIG. 5 depicts a flow diagram illustrating an embodiment 500 of an example process for identifying geometric parameters from image content for example welding tracking and/or motion system 200. It should be noted that content acquired or produced, such as, for example, input signals, output signals, operations, results, etc. associated with example process 500 may be represented via one or more digital signals. It should also be appreciated that even though one or more operations are illustrated or described concurrently or with respect to a certain sequence, other sequences or concurrent operations may be employed. In addition, although the description below references one or more particular aspects and/or features illustrated in certain other figures, one or more operations may be performed with other aspects and/or features.

In an implementation, an example process may begin at operation 510, wherein motion system parameters may be applied to real-time calibration parameters, discussed more fully below. Further, as generally indicated at operation 520, a parameter set representative of line measurements obtained via example process 400, described above, may be generated. For example, as was indicated, parameters representative of a center of a line for individual columns of a frame of image content may be stored in an array, such as in a memory of computing device 210. Additional analysis of a laser line may benefit from mathematical geometric entities being constructed from the stored array of parameters. In general, two types of geometry may be fit to a stored array of parameters, such as lines and/or ellipses. Also, in general, a welding shop may weld on basic shapes such as flat plates (e.g., welding together two sheets of a material) and/or cylinders (e.g., welding a seam between two sections of a cylindrical tank). Thus, to weld plates and/or cylinders, side profile geometries may be suitably approximated by one or more lines and/or partial ellipses, for example. In an implementation, lines and/or partial ellipses may be fitted to an array of parameters representative of a center of a line for individual columns of a frame of image content, as discussed more fully below.

In an implementation, a random sample consensus (RANSAC)-type operation may be performed on a parameter set to detect, for example, a top surface of a material undergoing welding operations (e.g., material on which a laser line may be projected). In general, RANSAC may comprise an iterative approach to estimate parameters of a mathematical model from a set of observed parameters that may contain outliers, when outliers are to be accorded no influence on the estimates. As explained more fully below in connection with FIGS. 12-14, a RANSAC-type operation such as utilized in conjunction with example process 500 may include some aspects of a RANSAC algorithm that may be altered in a manner such as to enhance computational efficiency. In an implementation, separate left and/or right zero planes (e.g., top surface of object illuminated by laser line) may be determined, as indicated at operation 530.

Responsive at least in part to a determination of zero planes, as described above, additional operations to fit a parameter set to one or more particular geometry entities may be performed. For example, as indicated at operation 540, a split/merge algorithm may be employed on a parameter set to generate line segments. For ellipses, as indicated, for example, at operation 550, another algorithm based at least in part on RANSAC may be employed, as described in more detail below in connection with FIGS. 12-14, for example. Further, as indicated at operation 560, zero planes, such as described above, may be utilized to identify one or more top surfaces, in an implementation. For example, left and/or right top surfaces may represent parts of a laser line not laying inside of a weld joint. See, for example, FIG. 7 for an image of a laser line laying across a weld joint. At least in part in response to a determination of top surfaces, geometric entities pertaining to a weld joint may be identified.

As further indicated at operation 570, sanity checks may be performed, such as to determine a degree of a fit one or more particular geometric entities, such as those identified and/or otherwise determined above in connection with example process 500, for example, are to a parameter set representative of line measurements, such as a parameter set described above in connection with operation 520, for example. In an implementation, at least in part in response to a determination that one or more particular geometric entities are not a suitable fit to a parameter set, a current frame of image content may be discarded. Further, in an implementation, an additional sanity check may be performed to determine whether the geometric entities form relationships that satisfactorily define a weld joint as expected. At least in part in response to the geometric entities not forming relationships that satisfactorily define a weld joint as expected, a current frame of image content may be discarded, for example.

Figure 6:
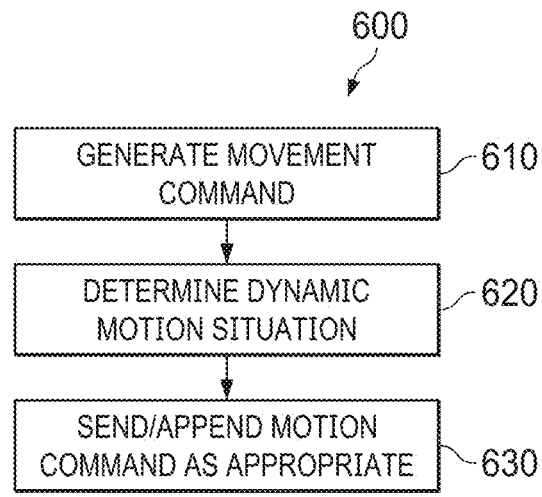
FIG. 6 depicts a flow diagram illustrating an example process for generating movement commands for an example welding tracking and/or motion system, in accordance with an embodiment.

FIG. 6 depicts a flow diagram illustrating an embodiment 600 of an example process for generating movement commands for tracking and/or motion system 200. It should be noted that content acquired or produced, such as, for example, input signals, output signals, operations, results, etc. associated with example process 600 may be represented via one or more digital signals. It should also be appreciated that even though one or more operations are illustrated or described concurrently or with respect to a certain sequence, other sequences or concurrent operations may be employed. In addition, although the description below references one or more particular aspects and/or features illustrated in certain other figures, one or more operations may be performed with other aspects and/or features.

As discussed above, upon tracking and/or motion control system 200 being initially turned on, tracking and/or motion control system 200 may move assembly 100 a specified distance, such as a specified distance up and left, for example. Prior to the movement, tracking and/or motion control system 200 may store an initial frame of image content. In response to the movement, a subsequent frame may be captured and compared with the initial frame. Computing device 210, for example, may determine angular and/or linear transforms such as to convert parameters determined through a comparison between an initial frame of image content and a subsequent frame to generate real-time calibration parameters.

In an implementation, tracking and/or motion control system 200 may periodically and/or occasionally update calibration parameters to keep assembly 100, for example, in proper alignment. Therefore, relatively small dislocations of a work piece (e.g., item(s) undergoing welding operation) and/or bumping of assembly 100, for example, may not negatively impact welding operations, thereby addressing at least some of the issues and/or challenges mentioned above. In an implementation, by using parameters from tracking and/or motion control system 200 and a tracking point, triangulation and/or rotational transforms that may help tracking and/or motion control system 200 produce real-world spatial relationships may be verified while the system is running. By comparing the actual motion generated by tracking and/or motion control system 200 to movement perceived by a vision system, such as camera 120 and/or computing device 210, for example, triangulation and/or rotational transforms may be adjusted. In this manner, for example, more reliable operation of assembly 100 and/or system 200 may be realized in the event assembly 100 and/or system 200 comes out of physical alignment. In an implementation, autonomous, relatively frequent and/or relatively continuous calibration operations may enhance ease-of-use and/or may increase reliability and/or efficiency.

Further, at least in part in response to a system start-up, an initial tracking point may be set, in an implementation. For example, an operator may utilize a joy stick, for example, such as to position assembly 100, for example, into a suitable position. The operator may press a start button and/or the like and tracking and/or motion control system 200 may record the particular position as an initial tracking point, in an implementation. Further, in an implementation, at least in part responsive to geometric entities being generated, such as described above in connection with example process 500, tracking and/or motion control system 200, currently in operation, may determine a feature point. Tracking and/or motion control system 200 may utilize the feature point, the initial tracking point and/or calibration parameters to determine whether assembly 100, for example, ought to be moved in order to perform welding operations at a correct location and/or at a correct height. In an implementation, tracking points may be determined at least in part in accordance with predefined relationships inherent to particular weld joint types. For example, tracking points may be determined at least in part by applying a set of rules unique to a selected and/or otherwise specified weld joint geometry. In an implementation, a weld joint definition may be specified, at least in part, as a set of geometric types, such as lines and/or ellipses, for example. Also, in an implementation, a tracking point may be determined at least in part by evaluating relationships between individual geometric entities within a particular weld joint definition set.

In an implementation, example process 600 may begin at operation 610. As indicated, a movement command may be generated. For example, as was indicated above, tracking and/or motion control system 200 may utilize a feature point, an initial tracking point and/or calibration parameters to determine whether assembly 100, for example, ought to be moved in order to weld over a correct location at a correct height. At least in part in response to a determination that no movement is needed to help ensure a weld occurs at a correct location at a correct height, no movement command may be generated, for example. However, in an implementation, at least in part in response to a determination that assembly 100 ought to be moved to help ensure a weld occurs at a correct location and/or at a correct height, a suitable movement command may be generated. In an implementation, one or more particular movement commands may be generated based, at least in part, on one or more particular feature points, one or more particular tracking points and/or one or more particular calibration parameters, such as describe above, for example.

Further, in an implementation, a dynamic motion situation, such as with respect to tracking and/or motion control system 200, for example, may be determined, as indicated at operation 620. Further, in an implementation, a motion command may be appended and/or otherwise altered based at least in part on a determined dynamic motion situation, as indicated at operation 630. For a particular example, one may consider an outside horizontal seam of a tapered section of a pipe undergoing welding operations as the section of pipe advances along a set of rollers. As the section of pipe rolls along the set of rollers the pipe may relatively slightly change shape due at least in part to the size and/or weight of the pipe. Or, for example, the set of rollers may come out of alignment and/or the tapered section of pipe may start to walk off of the rollers because of its taper, to list a few example circumstances. Such circumstances and/or the like may alter the alignment of laser 130 and/or camera 120 with respect to the item being welded (e.g., tapered section of pipe). In an implementation, tracking and/or motion control system 200 may correct its calibration parameters in order to maintain a reliable tracking point and/or height. For example, to correct calibration parameters, tracking and/or motion control system 200 may continuously and/or relatively frequently evaluate the actual motion perceived by system 200 against the calculated movement determined by system 200. Based at least in part on such an evaluation, triangulation and/or rotational transforms responsible at least in part for proper calculation of real world coordinates may be adjusted, in an implementation.

Figure 8:
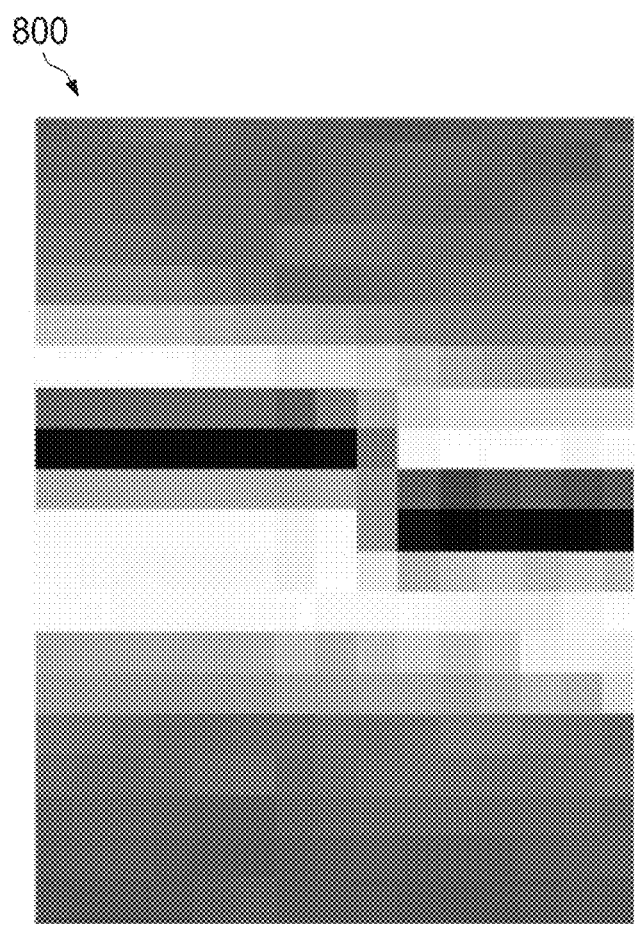
FIG. 8 is an illustration depicting an example magnified image of an example weld seam, in accordance with an embodiment.

As discussed above, an isolated blob filter (IBF) may be utilized, such as to remove unwanted light from an image prior to additional processing of the image. As was indicated, FIG. 7 is an illustration depicting an example image 700 of an example weld seam. FIG. 8 is an illustration depicting an example magnified image 800 of an example weld seam. For example, image 800 depicts a magnified section of image 700. Under such magnification, individual pixel intensities may be noted. It may also be noted that pixel brightness may increase in a relatively predictable way as a center of a laser line is approached. As mentioned, laser line intensity may follow a gaussian distribution. A gaussian distribution property may be utilized, such as to reduce and/or eliminate a wide range of noise within an image. Pixel intensity distribution may represent one or more particular criteria utilized by tracking and/or motion control system 200, such as to reduce and/or eliminate noise. However, other criteria may also be utilized. For example, a laser line may also have a property of being continuous. By utilizing a nearest neighbor analysis, a determination with respect to left to right continuity, for example, may be performed.

Figure 9:
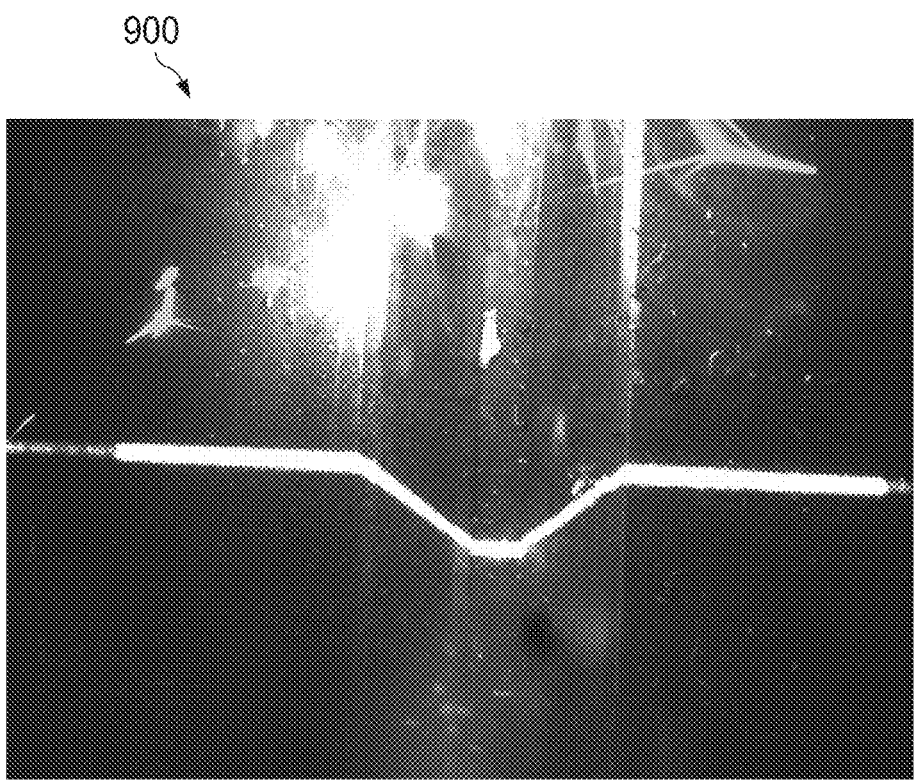
FIG. 9 is an illustration depicting an example image of an example welded surface, in accordance with an embodiment.
Figure 10:
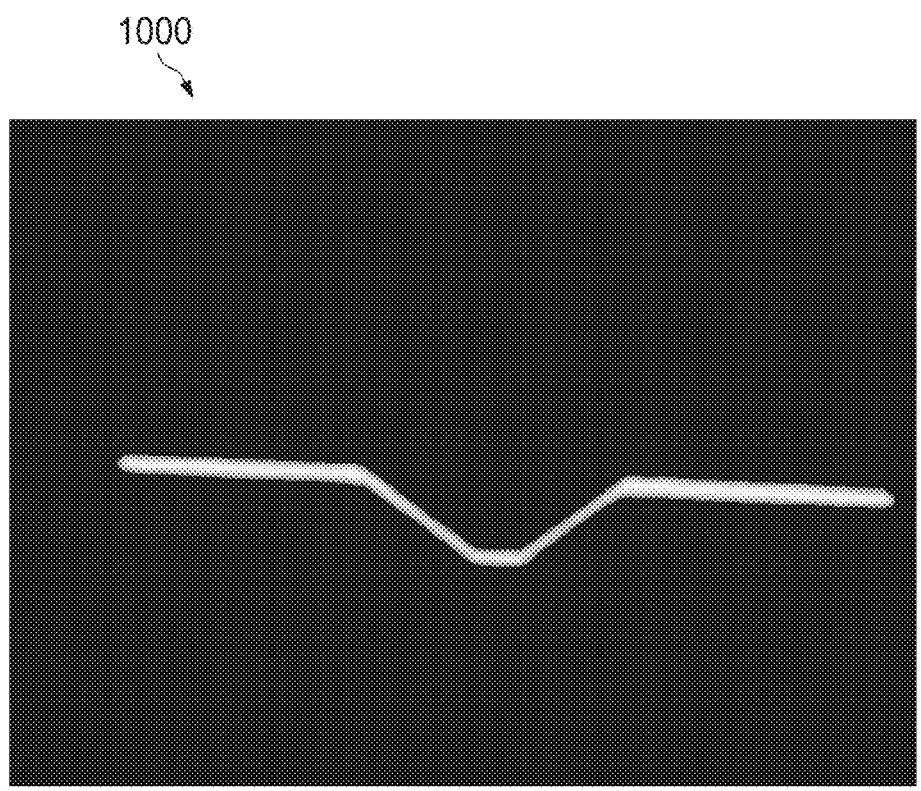
FIG. 10 is an illustration depicting an example filtered image of an example welded surface, in accordance with an embodiment.

Consider, for example, example image 900 depicted at FIG. 9. Image 900 is an illustration depicting an example image of three laser lines projected onto an example welded surface. Example image 900 further depicts sparks being emitted by a welding process. In contrast, image 1000 depicted in FIG. 10, for example, depicts an example image of the same three laser lines as shown in example image 900 but with the sparks having been removed via execution of an IBF over the image.

Figure 11:
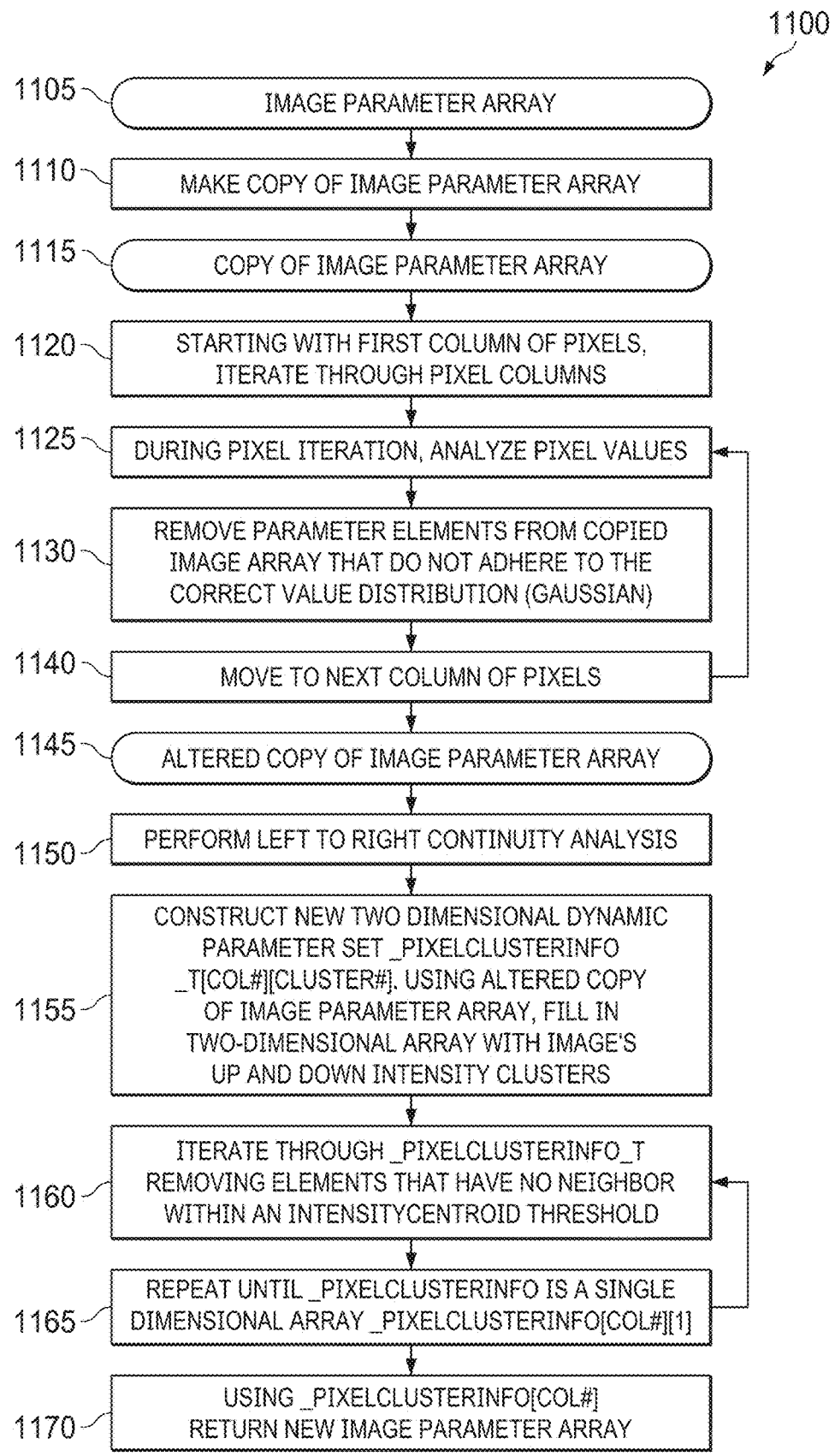
FIG. 11 depicts a flow diagram illustrating an example process for filtering image content, in accordance with an embodiment.

FIG. 11 depicts a flow diagram illustrating an embodiment 1100 of an example process for filtering image content. In an implementation, example process 1100 may comprise an IBF. It should be noted that content acquired or produced, such as, for example, input signals, output signals, operations, results, etc. associated with example process 1100 may be represented via one or more digital signals. It should also be appreciated that even though one or more operations are illustrated or described concurrently or with respect to a certain sequence, other sequences or concurrent operations may be employed. In addition, although the description below references one or more particular aspects and/or features illustrated in certain other figures, one or more operations may be performed with other aspects and/or features.

In an implementation, as indicated at 1105, an example IBF may electronically receive as input one or more signals and/or signal packets comprising an array of image parameters. For example, an array of image parameters may comprise a set of parameters indicating a respective set of pixel values for a frame of captured image content. At operation 1110, for example, a copy may be made of image parameter array 1105, in an implementation. Also, in an implementation, a copy 1115 of an image parameter array may be provided to operation 1120, as indicated. As further indicated at operation 1120, columns of pixels may be iterated through, beginning at a first column of pixels, for example.

In an implementation, during pixel iteration as described above in connection with operation 1120, pixel values may be analyzed, as indicated at operation 1125. As further indicated at operation 1130, pixel values that are determined to not adhere to a specified gaussian distribution may be removed from copied image parameter array 1115, in an implementation. Further, in an implementation, example process 1100 may proceed to operation 1140. At operation 1140, for example, pixel iteration may move to a next column unless there are no further columns to process. Once all columns have been iterated through, an altered copy 1145 of the image parameter array may be provided to an example left to right continuity analysis operation, as indicated at 1150.

At least in part in response to a left to right continuity analysis performed at operation 1150, for example, a new two-dimensional dynamic parameter set may be constructed, as indicated at operation 1155, in an implementation. Further, in an implementation, a new two-dimensional dynamic parameter set may be labeled _pixelclusterinfo_t[column #][cluster #]. As also indicated at operation 1155, utilizing altered copy 1145 of the image parameter array, two-dimensional array _pixelclusterinfo_t[column #][cluster #] may be filled in with an image's up and down intensity clusters, for example.

Example process 1100 may subsequently proceed to operation 1160, wherein two-dimensional array_pixelclusterinfo_t[column #][cluster #] may be iterated through, such as to remove pixel values that have no neighbor within an intensity centroid threshold, in an implementation. Also, in an implementation, as indicated at 1165, the iteration described in connection with operation 1160 may be repeated until array_pixelclusterinfo_t is determined to comprise a single-dimensional array _pixelclusterinfo_t[column #][1], for example. Further, based at least in part on single-dimensional array_pixelclusterinfo_t[column #][1], a new image parameter array may be returned to be used as inputs for other operations, such as geometric construction operations described above in connection with example process 500, for example.

As discussed above, in an implementation, a random sample consensus (RANSAC)-type operation may comprise an iterative approach such as to estimate parameters of a mathematical model from a set of observed parameters that may contain outliers, when outliers are to be accorded no influence on the estimates. For example, a RANSAC-type operation may determine patterns in parameter sets where noise may be present. Two or more parameter values may be randomly selected and/or a conditional expression may be evaluated, such as explained more fully below in connection with operations 1410 and 1420, for example. Other parameter values may be applied to the conditional expression, such as to determine how good a fit a parameter set is to the expression, in an implementation. In a circumstance wherein a particular parameter value is not a good fit, the parameter value may be rejected, for example. The number of good fit parameter values may be utilized as a weight value and/or as a type of vote count, such as explained more fully below in connection with operation 1436, for example. In an implementation, a current expression and/or a number of votes may be stored, for example, and/or another expression may be generated and/or a voting process may begin anew. After several iterations, the expression with a highest number of votes may be determined to comprise a best fit expression for a given set of parameters, for example.

Figure 12:
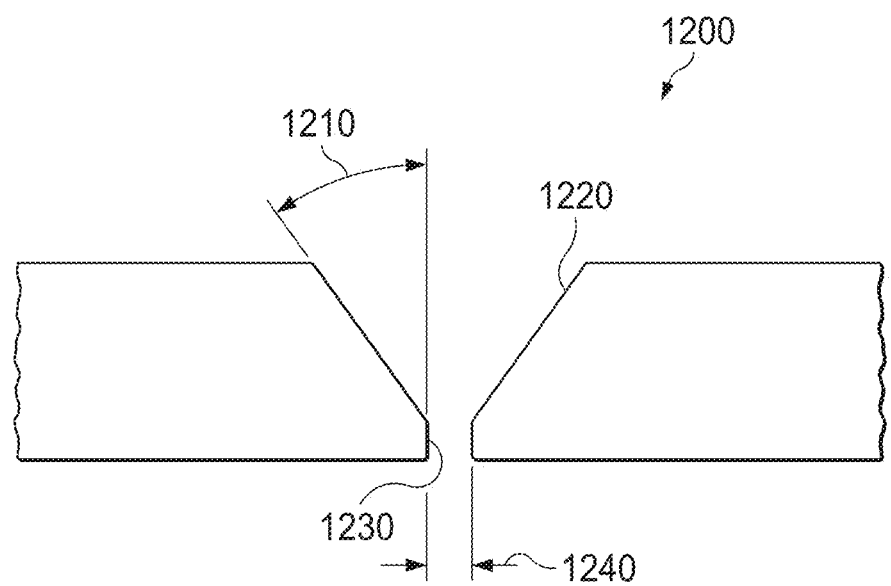
FIG. 12 is an illustration depicting a cross-sectional view of an example weld joint, in accordance with an embodiment.
Figure 13:
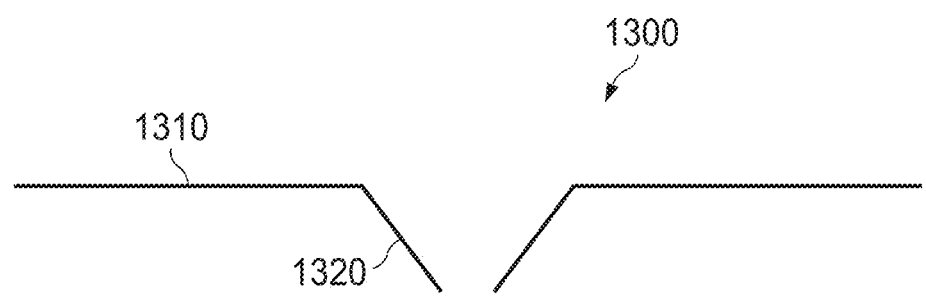
FIG. 13 is an illustration depicting an example image of a laser line projected over an example weld joint, in accordance with an embodiment.

As previously indicated, a RANSAC-type operation such as utilized in conjunction with example process 500, for example, may include some aspects of a RANSAC algorithm that may be altered in a manner to enhance computational efficiency, in an implementation. Also, in an implementation, a RANSAC-type operation may be performed on a parameter set to detect, for example, a top surface of a material undergoing welding operations (e.g., material on which a laser line may be projected). FIG. 12 is an illustration depicting a cross-sectional view 1200 of an example weld joint. Cross-sectional view 1200 depicts a bevel angle 1210, a root face 1230, a groove face 1220, and a root opening 1340, for example. Further, FIG. 13 is an illustration depicting an image 1300 of a laser line projected over an example weld joint. For example, image 1300 depicts a top surface 1310 of a plate and a beveled root 1320.

Figure 14:
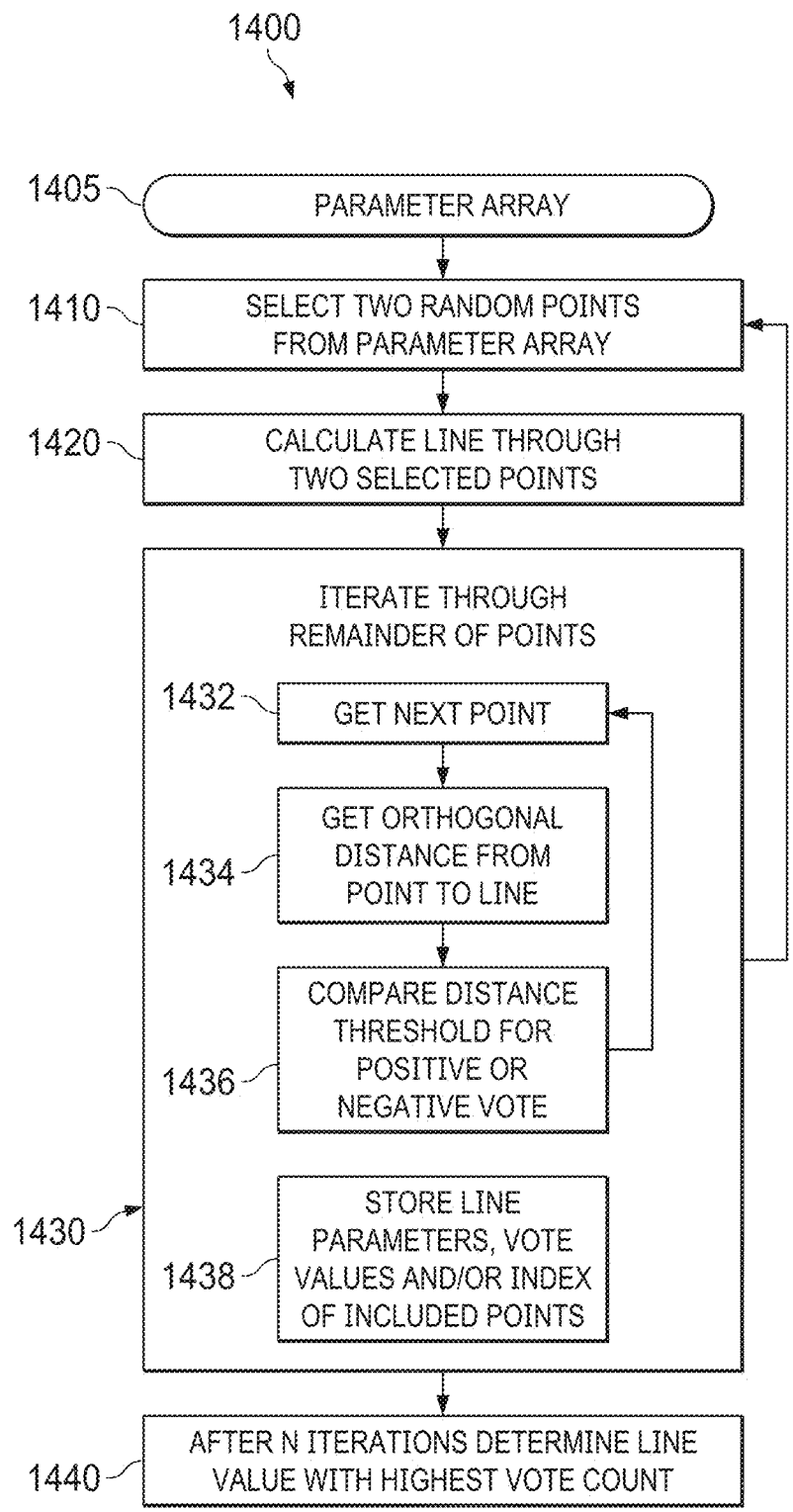
FIG. 14 depicts a flow diagram illustrating an example process for determining a top surface of a material to be welded, in accordance with an embodiment.

FIG. 14 depicts a flow diagram illustrating an embodiment 1400 of an example process for determining a top surface of an item to be welded. In an implementation, individual pixel values of a laser line as detected by camera 120, for example, may make up a parameter set. Via utilization of a RANSAC-type operation, such as may be modified to improve computational efficiency, points of a parameter set belonging to a top surface of a plate, for example, may be determined with relatively high confidence, as more fully described below. It should be noted that content acquired or produced, such as, for example, input signals, output signals, operations, results, etc. associated with example process 1400 may be represented via one or more digital signals. It should also be appreciated that even though one or more operations are illustrated or described concurrently or with respect to a certain sequence, other sequences or concurrent operations may be employed. In addition, although the description below references one or more particular aspects and/or features illustrated in certain other figures, one or more operations may be performed with other aspects and/or features.

Example process 1400 may begin, for example, with a parameter array 1405 as an input. As was indicated, an objective of example process 1400 is to find points of a parameter array that lie on a top surface of an item to be welded. In an implementation, individual points of a parameter array may comprise column, row indices associated with particular pixel values. In an implementation, parameter array 1405 may comprise a set of m points derived from a captured image of a projected laser line. As indicated at operation 1410, two random and/or substantially random points may be selected from parameter array 1405, in an implementation. Further, in an implementation, a line through the two selected points may be calculated, as indicated at 1420.

As indicated at operation 1430, a series of operations may be iterated through a remainder of points of parameter array 1405 (e.g., points not previously selected at operation 1410), in an implementation. For example, at operation 1432, a next point may be obtained. In an implementation, an orthogonal distance from the point obtained at operation 1432 to the line through the two points selected at operation 1410 may be determined at operation 1434. Further, for example, as indicated at block 1436, a distance determined at operation 1434 may be compared with a threshold value to determine a positive or negative vote for a current point. Example operation 1430 may return to operation 1432 to continue iterating through the remainder of points, in an implementation. Also, in an implementation, line parameters, vote values and/or indices of included points may be stored in a memory, for example, as indicated at block 1438.

Additionally, in an implementation, a number N of iterations (e.g., N iterations) of example operations 1410, 1420 and/or 1430 may be performed, after which a line value with a highest vote count may be determined. In an implementation, a line with a highest vote count may be determined to represent a top surface of a material to be welded. In an implementation, the greater number of iterations, the better the chances for a more reliable and/or more suitable result. Further, as discussed above, further sanity checks and/or other operations may be performed to determine whether a line determined to represent a top surface of a material to be welded meets specified characteristics that may be indicative of an expected scan of a weld joint.

As discussed above in connection with FIG. 2, for example, tracking and/or motion control system 200 may include one or more microcontrollers 220 and/or one or more motors 230. In an implementation, tracking and/or motion control system 200 may comprise a computer numerical control (CNC) controller that may operate in a manner substantially compatible and/or compliant with a ISO-6983-type standard, for example. A feedback protocol may facilitate reporting of parameters related to movement of assembly 100 to computing device 210, for example. In an implementation, one or more microcontrollers 220 may communicate with computing device 210 via an ethernet connection and/or through a universal serial bus (USB) connection, for example. Of course, claimed subject matter is not limited in scope in these respects.

In an implementation, tracking and/or motion control system 200 may incorporate a multi-axis motion control system, such as a ten-axis motion control system, with s-curve accelerations, although, of course, claimed subject matter is not limited in scope in these respects. "S-curve acceleration" and/or the like as utilized herein refers to a velocity vs. time profile for an acceleration that is at least substantially free from discontinuities. See example graph 1500 of FIG. 15, described more fully below. Example mechanisms by which tracking and/or motion control system 200 plans and/or executes its pulse train are described below. In an implementation, stepper motor pulses may be generated in such a way as to reduce and/or minimize impact forces on a moving body. For example, because tracking and/or motion control system 200 may drive equipment that may deposit molten materials, it would be beneficial to minimize and/or reduce motion-induced impulsive forces resulting from a motor's accelerations. Therefore, a linear acceleration ramp model may not be well suited. In an implementation, accelerations may be blended to create s-curve accelerations. As compared with a linear velocity ramp, an s-curve profile may significantly reduce acceleration-related impact forces, thereby resulting in a much more smooth motion experience, for example. Also, for example, by introducing a non-zero jerk into motion kinematics, the impulsive forces caused from acceleration/deceleration may be reduced.

In an implementation, tracking and/or motion control system 200 may implement an approach of fitting an ideal velocity s-curve with a trapezoidal profile. For example, a linear acceleration may be provided and a jerk value may be calculated in order to make a profile fit, as explained more fully below. Given a set of specified settings and/or pre-calculated values, defining properties of an ideal s-curve may be computed in real time. In an implementation, using an approach to fitting that allows for pre-calculated values to be used in such a manner may greatly reduce real-time computation overhead required from motion systems microcontroller(s) 220, for example. As mentioned, a motion controller for tracking and/or motion control system 200 may be implemented at least in part on an Atmel ARM Cortex A-5 SAMA5D44 microprocessor. Further, in an implementation, one or more software agents may be written in the C programming language. However, claimed subject matter is not limited in scope in these respects.

In an implementation, computing device 210, for example, may generate a movement command, as described above, for example, in connection with FIG. 6. As was indicated, a movement command may be provided to one or more microcontrollers 220, in an implementation. Further, in an implementation, one or more microcontrollers 220 may plan a motion for assembly 100, for example, based at least in part on one or more obtained movement commands. Further, for example, and as more fully discussed below, microcontroller(s) 220 may calculate timings for individual step motor pulses. Also, for example, microcontroller(s) 220 may generate signals and/or signal pulses that may drive one or more motors 230 in one or more particular ways, depending, at least in part, on a particular motion plan and/or on one or more particular timings for individual motors 230.

In an implementation, a motion block parameter structure may contain parameters that may be utilized to generate step signals (e.g., signals and/or signal pulses for one or more particular motors 230). In an implementation, movement commands may comprise, at least in part, one or more lines of g-code. "G-code" refers to computer-readable code and/or instructions utilized to control movement of automated machine tools. For example, movement of CNC machines may be controlled via g-codes in some circumstances. In an implementation, computing device 210, for example, may provide lines of g-codes to microcontroller(s) 220. Further, in an implementation, microcontroller(s) 220 may generate individual motion blocks based at least in part on at least one line of g-code obtained from computing device 210.

In an implementation, as movement commands, such as in the form of lines of g-code, for example, are obtained from computing device 210, microcontroller(s) 220 may analyze individual point-to-point movement commands, such as to determine a suitable motion plan for assembly 100, for example. In generally, dynamics of motion dictate that microcontroller(s) 220 take into account direction changes, acceleration ramping and/or interpolation of multiple axis. Based at least in part on such considerations, microcontroller(s) may generate signals and/or signal pulses for motors 230, such as to implement a determined motion plan, as discussed more fully below.

In an implementation, for a motion control software agent, such as may be executed by microcontroller(s) 220, various control constants, variables and/or parameter structures may be defined. For example, as seen in table 1, below, several user-specified control constants may be defined.

TABLE 1

| | user-specified control constants |
|---|---|
| a | linear acceleration of trapezoidal profile (mm/s$^2$) |
| $f_{timer}$ | clock frequency of timer counter (Hz) |
| $v_{max}$ | maximum velocity for system (mm/s) |
| τ | inverse of $f_{timer}$ |
| γ | steps per mm |

Further, in an implementation, parameter structure Motion_Block may be defined. As was indicated, a motion block parameter structure may contain parameters that may be utilized such as to generate step signals with suitable timings. In an implementation, parameter structure Motion_Block may be initially represented in a C programming language as follows:

```
struct Motion_Block {
    ...
    ...
    ...
};
```

Figure 15:
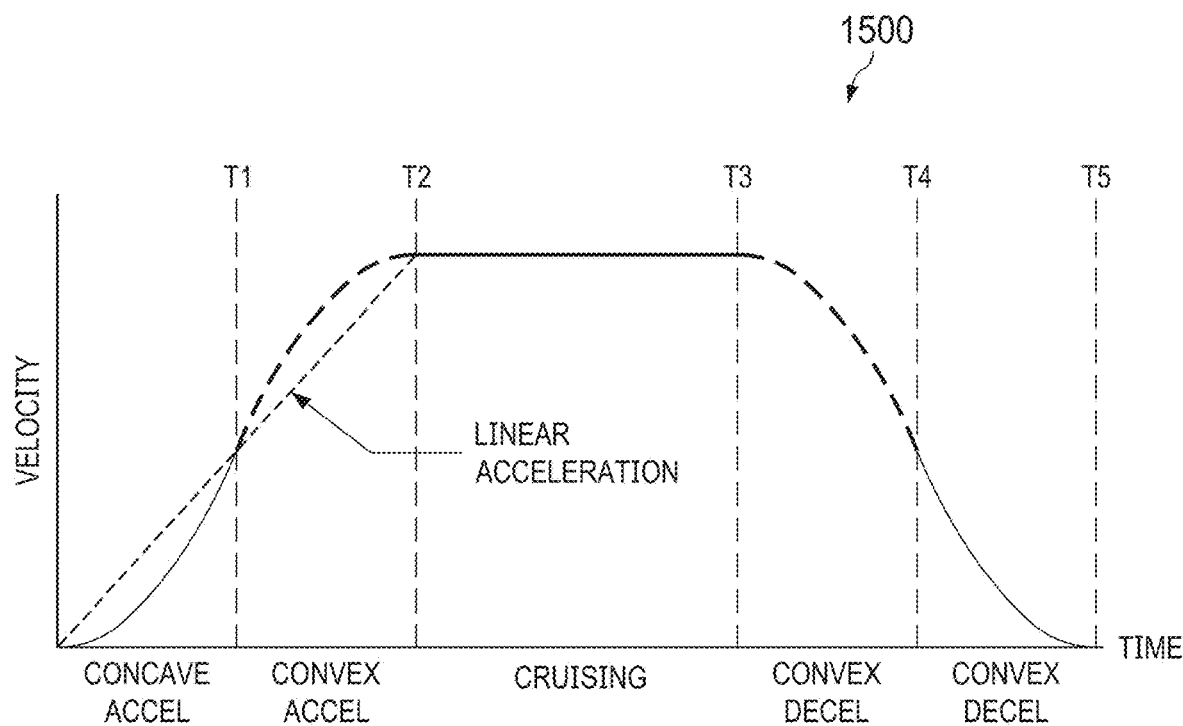
FIG. 15 is an illustration depicting an example velocity vs. time graph for an example motion control system movement, in accordance with an embodiment.

FIG. 15 is an illustration depicting an example velocity vs. time graph 1500 for an example system movement. In an implementation, a full movement may comprise multiple parts. For example, as depicted in example graph 1500, a movement may be partitioned into five parts. For example, a first part may comprise a period of time between T0 and T1, a second part may comprise a period of time between T1 and T2, a third part may comprise a period of time between T2 and T3, a fourth part may comprise a period of time between T3 and T4, and a fifth part may comprise and a period of time between T4 and T5. In an implementation, individual parts of a movement may be modeled with individual and/or separate functions, with functions for all parts in a same time domain. In an implementation, a motion plan may incorporate movements for individual parts that flow one part into a next in a suitable fashion.

In an implementation, microcontroller(s) 220 may operate multiple motors 230, interpolated to provide coordinated motion control. A motion control software agent executed at microcontroller(s) 220 may utilize a modified version of Bresenham's line algorithm, for example, to interpolate other axis. In an implementation, enumerated structure Motion_Type may describe a type of motion for individual parts of a movement:

enum Motion_Type{NONE, CONCAVEACCEL, CONVEXACCEL, CRUISING, CONVEXDECEL, CONCAVEDECEL};

Further, in an implementation, an enumerated structure Axis_Type may identify a particular axis:

enum Axis_Type{AXIS1=0, AXIS1=0, AXIS1=0, AXIS1=0, AXIS1=0, AXIS1=0, AXIS1=0, AXIS1=0, AXIS1=0, AXIS1=0,};

Additionally, in an implementation, a structure Motion_Sub_Part may contain parameters pertaining to a particular part of a motion:

```
struct Motion_Sub_Part {
    Motion_Type motion_type;
    Kinematic_Function_Pointer kinematic function;
    double beginning_time;
    double ending_time;
    ...
    ...
};
```

Further, a pointer Kinematic_Function_Pointer may be defined, wherein the pointer may point to a particular kinematic specification, such as for a particular part of a movement:

typedef double (*Kinematic_Function_Pointer)(double);

Also, in an implementation, an Axis_Interpolation structure may contain relevant content with respect to interpolating individual axis. This structure is further discussed below.

```
struct Axis_Interpolation {
    ...
    ...
};
```

In an implementation, individual instances of Motion_Block may include parameters to govern movement for respective individual parts of a motion. For example, for a movement with five parts, an array of five Motion_Block structures may be defined. Further, as indicated, a Motion_Type may be defined with NONE elements in some instances. For example, allowing NONE elements for Motion_Type allows for customization of Motion_Sub_Part structures. In an implementation, for a situation in which a particular movement includes less than five parts, appropriate motion_part elements may have a motion_type=Motion_Type.NONE. Further, in an implementation, structure Motion_Block may be defined as follows:

```
struct Motion_Block {
    Axis_Type master axis;
    Motion_Sub_Part motion part[5];
    Axis_Interpolation other_Axis[9];
    double total_time_of_movement;
    double current_time_of_movement;
    double distance_to_travel;
    int steps_to_travel;
    int steps_left_to_travel;
    double starting_velocity;
    double ending_velocity;
    double target_velocity;
    double achievable_velocity;
    double accel_jerk;
    double accel_jerk;
    ...
    ...
};
```

In an implementation, g-code movements may be specified in terms of piecewise linear movements, wherein junctions between linear movements involve one linear movement immediately turning and continuing to a next linear movement. However, motion control systems, such as CNC machines and/or tracking and/or motion control system 200, for example, may not accomplish instantaneous and immediate changes in direction. For example, stepper motors may have a finite amount of torque. Further, for example, relatively high inertial forces needed to make such instantaneous changes in direction may result in a step motor losing steps. In some situations, losing steps may be disadvantageous due at least in part to open-loop control (e.g., no feedback mechanism) for some systems, for example. In some situations, for example, a stepper motor merely receives signals and/or signal pulses and attempts to move the motor. If a step is missed, such as due to inertial forces, for example, a controller, such as controller(s) 220, may have no idea that steps have been lost and a machine's (e.g., assembly 100) true location may be lost.

Referring again to FIG. 15 and example image 1500, kinetics for a constant jerk motion planner may be specified in order to derive, at least in part, count value functions to be utilized for one or more timer counters for a software agent for motion control, such as may be executed by microcontroller(s) 220, as described more fully below. In an implementation, relations may be derived to be in the same time domain so as to avoid offset situations within a kinematic model. Further, in an implementation, individual Motion_Sub_Part structures may utilize a different kinematic relation with time constrained domains. For the description to follow, note that $t_{begin}$ and $t_{end}$ represent beginnings and endings to one or more particular sub parts of a movement, rather than a beginning and ending to the overall movement.

In an implementation, various accelerations within an example kinematic model may be specified according to the following relations.

$$\text{Concave Acceleration} - v(t) = \tag{1}$$

$$v_{entry} + \left(\frac{j_{accel}}{2}\right)(t - t_{begin})^2 \{t_{begin} \leq t \leq t_{end}\}$$

$$\text{Convex Acceleration} - v(t) = \tag{2}$$

$$v_{target} - \left(\frac{J_{accel}}{2}\right)(t - t_{begin})^2 \{t_{begin} < t \leq t_{end}\}$$

$$\text{Cruise} - v(t) = v_{target} \{t_{begin} < t \leq t_{end}\} \tag{3}$$

$$\text{Convex Deceleration} - v(t) = v_{target} - \left(\frac{j_{decel}}{2}\right)(t - t_{begin})^2 \{t_{begin} < t \leq t_{end}\} \tag{4}$$

$$\text{Concave Deceleration} - v(t) = v_{exit} + \left(\frac{j_{decel}}{2}\right)(t - t_{begin})^2 \{t_{begin} < t \leq t_{end}\} \tag{5}$$

In relations 1-5, it may be noted that a jerk value for acceleration ($J_{accel}$) and a jerk value for deceleration ($J_{decel}$) may comprise separate values. In an implementation, jerk values may be calculated and/or otherwise specified prior to use of kinematic relations. This may allow for independent shaping of movements between acceleration portions and deceleration portions. In an implementation, a jerk value may be calculated and/or otherwise specified for individual parts of a movement to allow for an improved and/or ideal s-curve fit within an allotted time of a particular ramp.

In an implementation, a movement may not start with a deceleration. Further, in an implementation, a movement may not end with an acceleration. For example, a target velocity for a particular part of a movement may be reached via acceleration within that particular part, while a deceleration into a next part of a motion may be accomplished in the prior part of the movement. Further, in an implementation, an acceleration may contain a concave and a convex portion, which may only coexist together in an appropriate order. Similarly, a deceleration may also include concave and convex portions in an appropriate order. In an implementation, jerk values $J_{accel}$ and $J_{decel}$ may be specified in accordance with the following relations.

$$j_{accel} = \frac{4a^2}{v_{target} - v_{entry}} \tag{6}$$

$$j_{decel} = \frac{4a^2}{v_{target} - v_{exit}} \tag{7}$$

Figure 16:
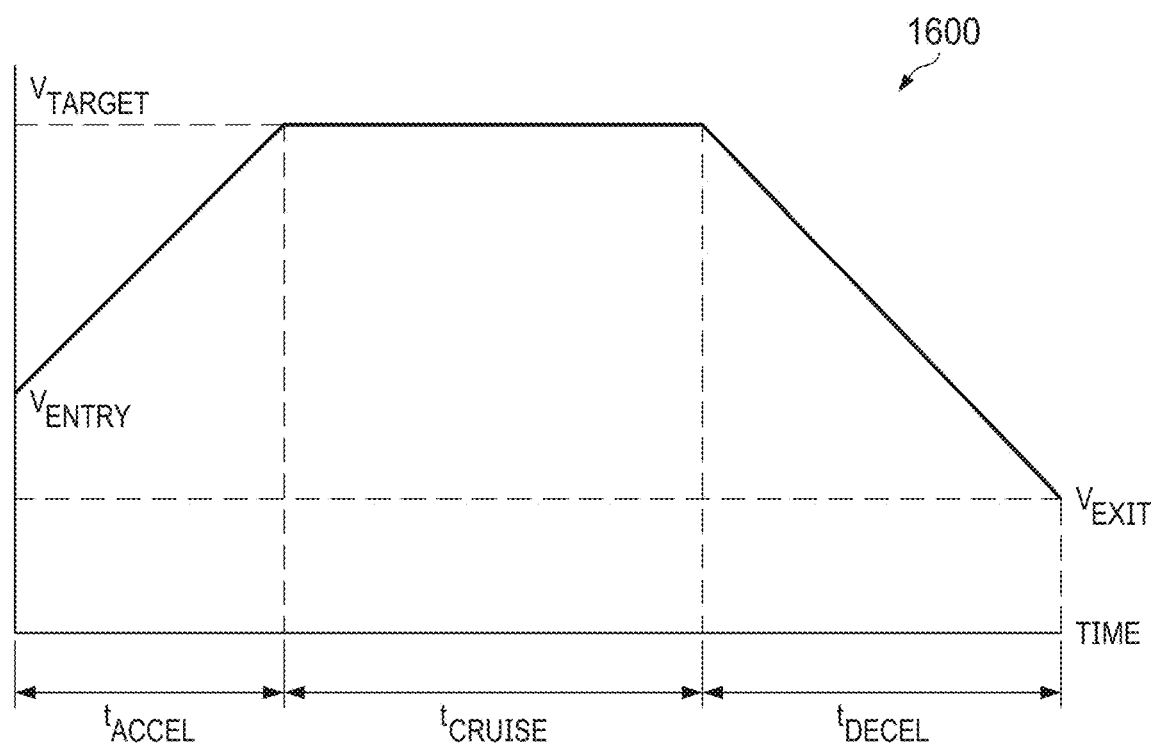
FIG. 16 is an illustration depicting an example trapezoidal velocity profile for an example motion control system movement, in accordance with an embodiment.

In an implementation, to calculate time domains for individual sub-parts of movements, trapezoidal representation of the movements may be employed. FIG. 16 is an illustration depicting an example trapezoidal velocity profile 1600 for an example movement for tracking and/or motion control system 200, in accordance with an embodiment. In an implementation, because s-curve ramps may be symmetric about a linear acceleration line, trapezoidal velocity representations may be utilized for the purposes of time and/or distance calculations. In an implementation, the follow relations are derived from motion kinematic considerations, such as described above, for example. Note that at least some parameters specified in accordance with the following relations correspond to at least some aspects depicted in example profile 1600.

$$t_{accel} = \frac{v_{target} - v_{entry}}{a} \tag{8}$$

$$d_{accel} = \frac{v_{target} + v_{entry}}{2} t_{accel} = \frac{v_{target}^2 - v_{entry}^2}{2a} \tag{9}$$

$$t_{decel} = \frac{v_{exit} - v_{target}}{-a} \quad (10)$$

$$d_{decel} = \frac{v_{exit} + v_{target}}{2} t_{decel} = \frac{v_{exit}^2 - v_{target}^2}{-2a} \quad (11)$$

$$d_{cruise} = d_{movement} - d_{accel} - d_{decel} = v_{target} t_{cruise} \quad (12)$$

$$v_{target} t_{cruise} = d_{movement} - \frac{v_{target}^2 - v_{entry}^2}{2a} + \frac{v_{exit}^2 - v_{target}^2}{2a} \quad (13)$$

$$t_{cruise} = \frac{d_{movement}}{v_{target}} - \frac{v_{target}^2 - v_{entry}^2}{2a v_{target}} + \frac{v_{exit}^2 - v_{target}^2}{2a v_{target}} \quad (14)$$

$$t_{cruise} = \frac{2a d_{movement} - (v_{target}^2 - v_{entry}^2) + (v_{exit}^2 - v_{target}^2)}{2a v_{target}} \quad (15)$$

$$t_{cruise} = \frac{2a d_{movement} - v_{target}^2 + v_{entry}^2 + v_{exit}^2 - v_{target}^2}{2a v_{target}} \quad (16)$$

$$t_{cruise} = \frac{2a d_{movement} - 2v_{target}^2 + v_{entry}^2 + v_{exit}^2}{2a v_{target}} \quad (17)$$

$$t_{movement} = t_{accel} + t_{decel} + t_{cruise} \quad (18)$$

In an implementation, expressing relations 8-18 in a particular time domain may yield the following relations.

$$t_{concave-accel-begin} = 0 \quad (19)$$

$$t_{concave-accel-end} = \frac{t_{accel}}{2} = \frac{v_{target} - v_{entry}}{2a} \quad (20)$$

$$t_{concex-accel-begin} = t_{concave-accel-end} = \frac{t_{accel}}{2} = \frac{v_{target} - v_{entry}}{2a} \quad (21)$$

$$t_{convex-accel-end} = t_{accel} = \frac{v_{target} - v_{entry}}{a} \quad (22)$$

$$t_{cruise-begin} = t_{convex-accel-end} = t_{accel} = \frac{v_{target} - v_{entry}}{a} \quad (23)$$

$$t_{cruise-end} = t_{cruise-begin} + \frac{2a d_{movement} - 2v_{target}^2 + v_{entry}^2 + v_{exit}^2}{2a v_{target}} = \quad (24)$$

$$\frac{v_{target} - v_{entry}}{a} + \frac{2a d_{movement} - 2v_{target}^2 + v_{entry}^2 + v_{exit}^2}{2a v_{target}}$$

$$t_{convex-decel-start} = \quad (25)$$

$$t_{cruise-end} = \frac{v_{target} - v_{entry}}{a} + \frac{2a d_{movement} - 2v_{target}^2 + v_{entry}^2 + v_{exit}^2}{2a v_{target}}$$

$$t_{convex-decel-end} = t_{convex-decel-start} + \frac{v_{exit} - v_{target}}{-2a} = \quad (26)$$

$$\frac{v_{target} - v_{entry}}{a} + \frac{2a d_{movement} - 2v_{target}^2 + v_{entry}^2 + v_{exit}^2}{2a v_{target}} + \frac{v_{exit} - v_{target}}{-2a}$$

$$t_{concave-decel-begin} = t_{convex-decel-end} = \quad (27)$$

$$\frac{v_{target} - v_{entry}}{a} + \frac{2a d_{movement} - 2v_{target}^2 + v_{entry}^2 + v_{exit}^2}{2a v_{target}} + \frac{v_{exit} - v_{target}}{-2a}$$

$$t_{concave-decel-end} = t_{concave-decel-begin} + \frac{v_{exit} - v_{target}}{-2a} = \quad (28)$$

$$\frac{v_{target} - v_{entry}}{a} + \frac{2a d_{movement} - 2v_{target}^2 + v_{entry}^2 + v_{exit}^2}{2a v_{target}} + \frac{v_{exit} - v_{target}}{-a}$$

In an implementation, a relatively computationally efficient approach to determining parameters for an example movement for tracking and/or motion control system 200 may include utilization of the following relations.

$$\text{Let } t_{halfdecel} = \frac{v_{exit} - v_{target}}{-2a} \quad (29)$$

$$t_{concave-accel-begin} = 0 \quad (30)$$

$$t_{concave-accel-end} = \frac{v_{target} - v_{entry}}{2a} \quad (31)$$

$$t_{convex-accel-begin} = t_{concave-accel-end} \quad (32)$$

$$t_{convex-accel-end} = 2t_{convec-accel-begin} \quad (33)$$

$$t_{cruise-begin} = t_{convex-accel-end} \quad (34)$$

$$t_{cruise-end} = t_{cruise-begin} + \frac{2a d_{movement} - 2v_{target}^2 + v_{entry}^2 + v_{exit}^2}{2a v_{target}} \quad (35)$$

$$t_{convex-decel-start} = t_{cruise-end} \quad (36)$$

$$t_{convex-decel-end} = t_{convex-decel-start} + t_{halfdecel} \quad (37)$$

$$t_{concave-decel-begin} = t_{convex-decel-end} \quad (38)$$

$$t_{concave-decel-end} = t_{concave-decel-begin} + t_{halfdecel} \quad (39)$$

In some circumstances, a specified movement may not be accomplishable. For example, in such circumstances, kinematics may create a situation wherein a target velocity cannot be obtained for a specified distance. For example, a particular specified distance may not allow enough time at a given acceleration for a specified motion to be achieved. In an implementation, determination of such a situation may employ known values for entry and exit velocities as well as a target velocity for individual parts of a movement. Also, for example, time domains for individual parts of a motion may be calculated. In situations wherein a specified movement is determined to not be accomplishable, a target velocity may be replaced with a more suitable value.

Figure 17:
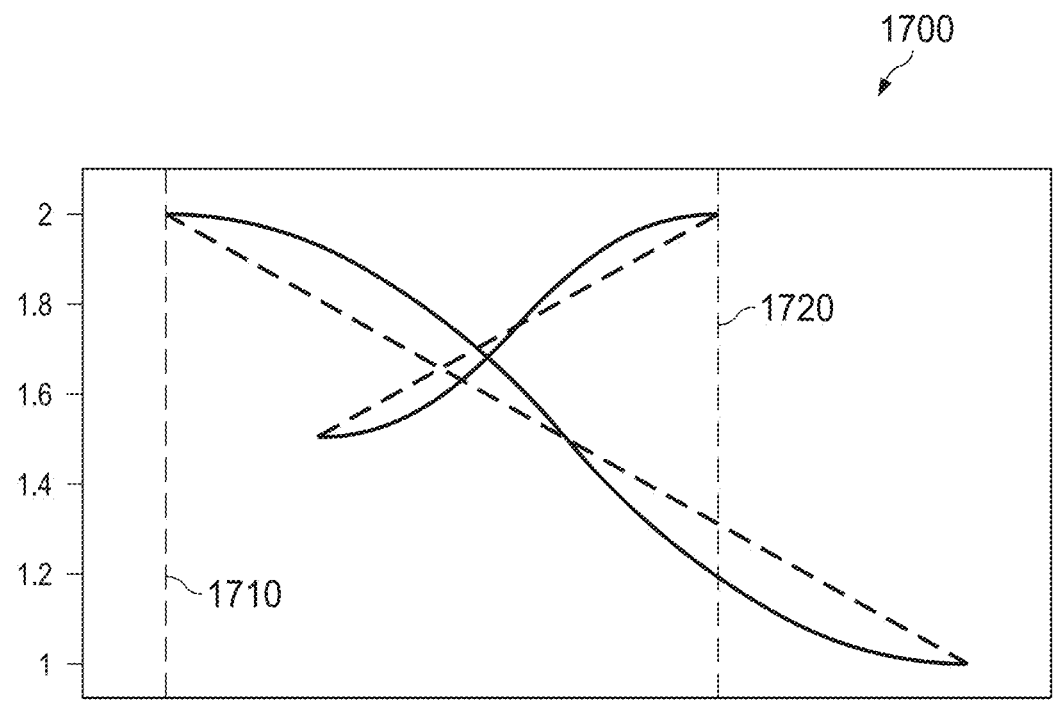
FIG. 17 is an illustration depicting an example velocity vs. time graph for an example unachievable motion control system movement, in accordance with an embodiment.

FIG. 17 is an illustration depicting an example velocity vs. time graph 1700 for an example unachievable movement. For example, it may be important to determine whether a planned movement can be executed by a particular motion control system within specified parameters. In an implementation, for situations in which $t_{convex-accel-end} > t_{convex-decel-begin}$, a movement may not be achievable. For example, as depicted in example graph 1700, $t_{convex-accel-end}$ (labeled 1720 in FIG. 17) is greater than $t_{convex-decel-begin}$ (labeled 1710 in FIG. 17). In this example, a planned motion may not be executed as specified. For example, a target velocity may need to be adjusted before the movement can be planned. The example depicted in example graph 1700 demonstrates a situation that does not allow for enough distance to traverse for a specified target velocity. In an implementation, to determine an achievable velocity for a particular distance ($d_{movement}$) to be traversed, consider the following relation.

$$d_{movement} = d_{accel} + d_{decel} \quad (40)$$

Note that a negative distance may be calculated in situations wherein a particular movement cannot be achieved.

$$d_{accel} = \frac{2a}{j_{accel}} (v_{target} + v_{entry}) \quad (41)$$

$$d_{decel} = \frac{2a}{j_{decel}} (v_{target} + v_{exit}) \quad (42)$$

Given the above, relation (43) provides the following.

$$d_{movement} = \frac{2a}{j_{accel}}(v_{target} + v_{entry}) + \frac{2a}{j_{decel}}(v_{target} + v_{exit}) \quad (43)$$

Expanding to solve for $v_{target}$ yields the following.

$$d_{movement} = \frac{2a}{j_{accel}}v_{target} + \frac{2a}{j_{accel}}v_{entry} + \frac{2a}{j_{decel}}v_{target} + \frac{2a}{j_{decel}}v_{exit} \quad (44)$$

Further, substitutions for $j_{excel}$ and/or $j_{decel}$ described above, may be performed, thereby resulting in the following relation (wherein interest is only in a positive square root), in an implementation.

$$v_{target\ adjusted} = \pm\sqrt{ad_{movement} + \frac{1}{2}v_{entry}^2 + \frac{1}{2}v_{exit}^2} \quad (45)$$

Thus, in an implementation, based at least in part on the previous relations, an adjusted target velocity may be calculated to ensure an achievable movement.

Turning now to FIG. 18, which depicts an example chart 1800 of several example consecutive linear movements. As indicated above, in an implementation, parameters $v_{entry}$, $v_{target}$ and/or $v_{exit}$ be defined for individual parts of a movement. As indicated in example chart 1800, part 1801 may begin with a velocity $v_{entry1}$, may achieve a target velocity of $v_{target1}$ and may finish with an exit velocity of $v_{exit1}$, for example. Similarly, part 1802 may begin with a velocity $v_{entry2}$, may achieve a target velocity of $v_{target2}$ and may finish with an exit velocity of $v_{exit2}$, for example. Also, as depicted in example chart 1800, part 1803 may begin with a velocity $v_{entry3}$, may achieve a target velocity of $v_{target3}$ and may finish with an exit velocity of $v_{exit3}$, and part 1804 may begin with a velocity $v_{entry4}$, may achieve a target velocity of $v_{target4}$ and may finish with an exit velocity of $v_{exit4}$, for example. In an implementation, a look-ahead operation may be performed, such as to determine parameters $v_{entry}$, $v_{target}$ and/or $v_{exit}$, for example. As readily seen through observation of example chart 1800, an exit velocity for any particular part must be equal to an entry velocity of a subsequent part.

Further, it may further be readily observed from example chart 1800 that planning of each part of a motion may depend at least in part on parts that follow. In an implementation, junction velocities (e.g., representative of entry and exit velocities at junctions of line segments) may be computed, as previously described. In an implementation, knowing entry and exit velocities, checks may be applied such as to determine whether a target velocity can be achieved. A new target velocity may be calculated in situations wherein a check determines that a target velocity cannot be reached. Further, in an implementation, interpolation techniques, such as those described herein, may plan motion for a major axis (e.g., an axis that travels a farthest distance). Interpolation of other axis is taken into account through planning motion based at least in part on a major axis, for example.

For another example, considering three consecutive movements $move_{n-1}$, $move_n$, and $move_{n+1}$. To determine motion values for $move_n$, the following relations may be utilized. For example, to find $$move_n \cdot v_{entry} = \min(v_{junction}, \min(move_{n-1} \cdot v_{target}, move_n \cdot v_{target})) \quad (46)$$

the following relation may be calculated.

$$v_{junction} = \sqrt{a\delta \frac{1 - \sqrt{1 - \frac{move_{n-1} \cdot v_{target} \cdot move_n \cdot v_{target}}{\|move_n \cdot v_{target}\|\|move_{n-1} \cdot v_{target}\|}}}{1 - \sqrt{1 - \frac{move_{n-1} \cdot v_{target} \cdot move_n \cdot v_{target}}{\|move_n \cdot v_{target}\|\|move_{n-1} \cdot v_{target}\|}}}} \quad (47)$$

The following may be noted.

$$move_{n-1} \cdot v_{exit} = move_n \cdot v_{entry} \quad (48)$$

Further, for example, to find $$move_n \cdot v_{exit} = \min(v_{junction}, \min(move_n \cdot v_{target}, move_{n+1} \cdot v_{target})) \quad (49)$$

the following relation may be calculated.

$$v_{junction} = \sqrt{a\delta \frac{1 - \sqrt{1 - \frac{move_n \cdot v_{target} \cdot move_{n+1} \cdot v_{target}}{\|move_{n+1} \cdot v_{target}\|\|move_n \cdot v_{target}\|}}}{1 - \sqrt{1 - \frac{move_n \cdot v_{target} \cdot move_{n+1} \cdot v_{target}}{\|move_{n+1} \cdot v_{target}\|\|move_n \cdot v_{target}\|}}}} \quad (50)$$

The following may be noted, for example.

$$move_{n+1} \cdot v_{entry} = move_n \cdot v_{exit} \quad (51)$$

Additionally, for example, a determination may be made as to whether $move_n \cdot v_{target}$ can be achieved. If not, then it may be adjusted to a value than can be achieved. See, for example, the following relation.

$$v_{target\ adjusted} = \pm\sqrt{ad_{movement} + \frac{1}{2}v_{entry}^2 + \frac{1}{2}v_{exit}^2} \quad (52)$$

In an implementation, the above operations may be repeated for subsequent motions.

Although particular relations and/or calculations are described with respect to planning and/or executing movements for a motion control system, such as tracking and/or motion control system 200, claimed subject matter is not limited in scope to the specific examples provided herein. Further, in an implementation, the various motion control examples described herein may be utilized in conjunction with the various tracking, calibration, image processing, geometric construction, movement command generation and/or the like operations, for example, described herein. For example, various example operations, devices, and/or approaches described herein, for example, may be utilized in various combinations to implement example tracking and/or motion control system, such as system 200, to be utilized, for example, in welding operations.

Figure 19:
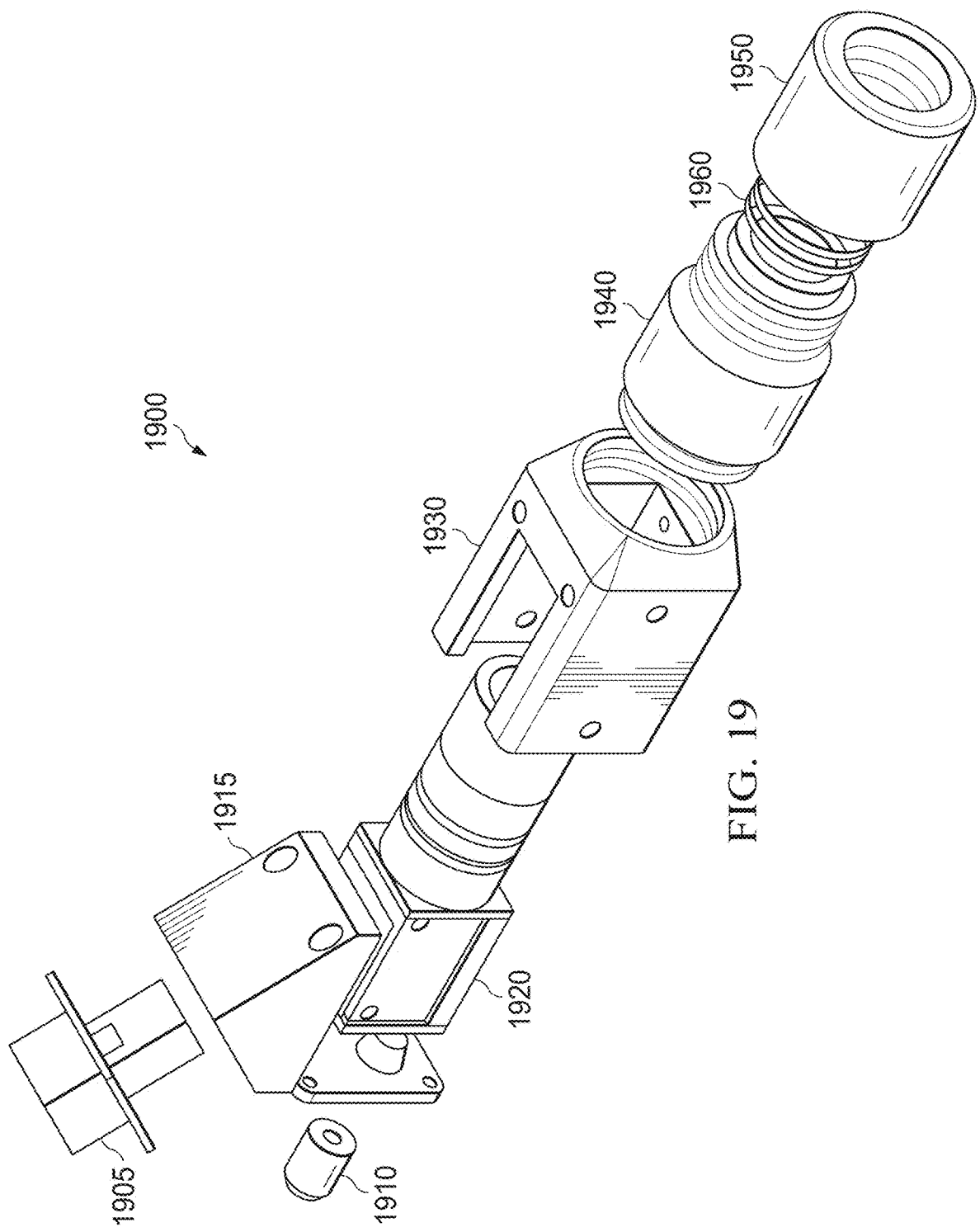
FIG. 19 is an illustration depicting an example camera assembly, in accordance with an embodiment.

Turning to FIG. 19, with is an illustration depicting an embodiment 1900 of an example camera assembly. In an implementation, camera assembly 1900 may include at least some characteristics of camera 120 described above. For example, assembly 1900 may include a Basler Machine Vision Camera 1920, for example, although claimed subject matter is not limited in scope in this respect. In an implementation, camera 1920 may generate digital image content for use by tracking and/or motion control system 200. In an implementation, digital image content, such as signals and/or signal packets comprising sets of digital image parameters, may be communicated between camera 1920 and tracking and/or motion control system 200 via a wired and/or wireless communication link. For example, camera 1920 may be communicatively coupled to tracking and/or motion control system 200 via CAT6/IPG7 port 1905 located in a plug housing 1915. Camera 1920 may also be fitted with an optical filter (not depicted). In an implementation, camera 1920 may be maintained within main housing body 1930, which may be comprised of plastic, for example. A lens focus cap 1940 may be provided, as well as a glass lens 1960 and a lens cap 1950.

In an implementation, camera assembly 1900 may include an air inlet 1910. For example, a compressed air supply system (not depicted) may be coupled to air inlet 1910. In an implementation, air delivered to air inlet 1910 may flow through plug housing 1915 and may flow across and/or through camera 1920. Additionally, for example, air may flow through main housing body 1930 and lens focus cap 1940. Air may further flow through lens cap 1950, and may also flow across glass lens 1960, for example. In an implementation, air flow may provide cooling for camera 1920 and/or for other parts of camera assembly 1900. Due at least in part to the typically harsh environments involved with welding operations, including relatively extreme temperatures, air cooling may be particularly beneficial. Further, in an implementation, air flowing across glass lens 1960 may help to keep the lens clean which may be particularly beneficial due, again, to the typically harsh environments in which such an assembly may be employed.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, MD, 21050-2747), but may include other aspects, such as the Hadoop distributed file system (HDFS) (available from the Apache Software Foundation, 1901 Munsey Drive, Forrest Hill, MD, 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 20:
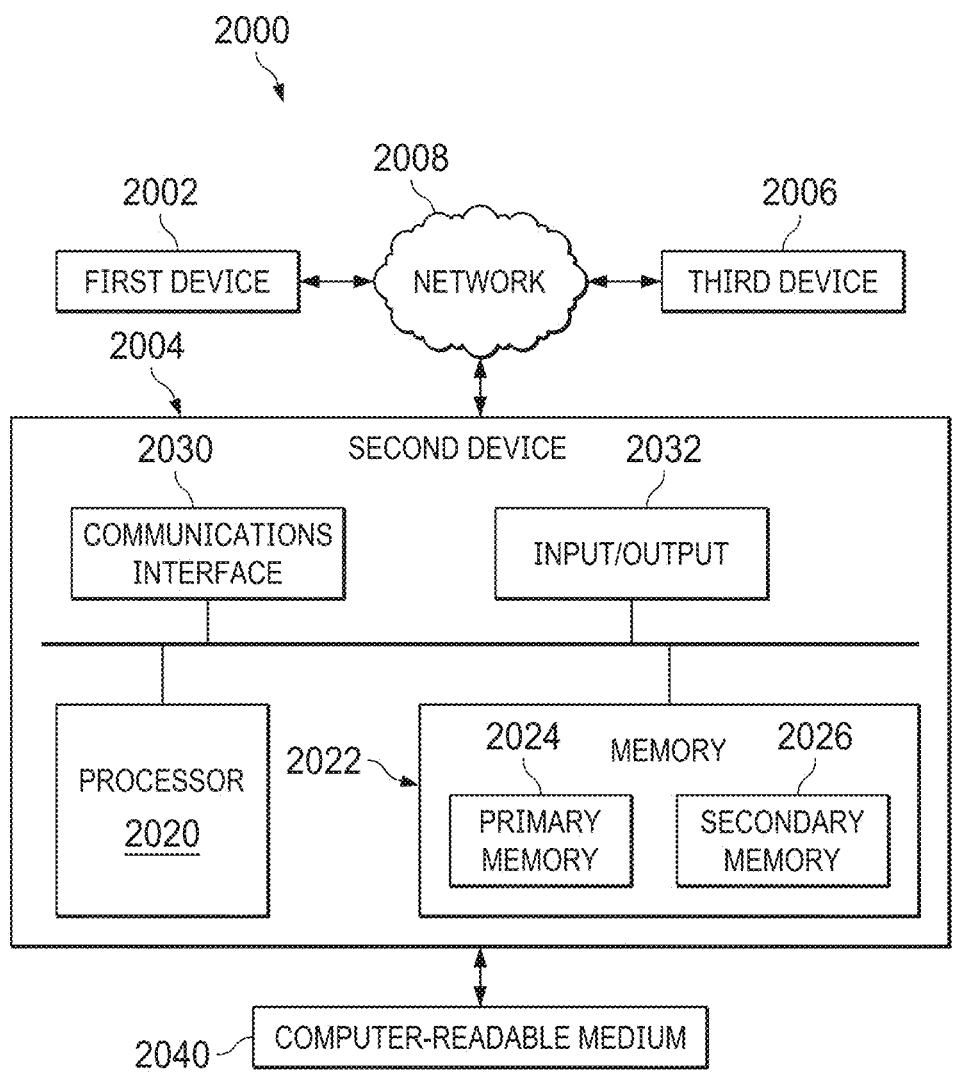
FIG. 20 is a schematic block diagram illustrating an example computing environment, in accordance with an embodiment.

In one example embodiment, as shown in FIG. 20, a system embodiment may comprise a local network (e.g., device 2004 and medium 2040) and/or another type of network, such as a computing and/or communications network. For purposes of illustration, therefore, FIG. 20 shows an embodiment 2000 of a system that may be employed to implement either type or both types of networks. Network 2008 may comprise one or more network connections, links, processes, services, applications, and/or resources to facilitate and/or support communications, such as an exchange of communication signals, for example, between a computing device, such as 2002, and another computing device, such as 2006, which may, for example, comprise one or more client computing devices and/or one or more server computing device. By way of example, but not limitation, network 2008 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 20 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1-19, and in the text associated with the foregoing figure(s) of the present patent application.

Referring now to FIG. 20, in an embodiment, first and third devices 2002 and 2006 may be capable of rendering a graphical user interface (GUI) for a network device and/or a computing device, for example, so that a user-operator may engage in system use. Device 2004 may potentially serve a similar function in this illustration. In particular implementations, one or more of devices 2002, 2004 and/or 2006 may be utilized in a tracking and/or motion control system, such as system 200, for example. Likewise, in FIG. 20, computing device 2002 ('first device' in figure) may interface with computing device 2004 ('second device' in figure), which may, for example, also comprise features of a client computing device and/or a server computing device, in an embodiment. Processor (e.g., processing device) 2020 and memory 2022, which may comprise primary memory 2024 and secondary memory 2026, may communicate by way of a communication bus 2015, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 2004, as depicted in FIG. 20, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 20, computing device 2002 may provide one or more sources of executable computer instructions in the form physical states and/or signals (e.g., stored in memory states), for example. Computing device 2002 may communicate with computing device 2004 by way of a network connection, such as via network 2008, for example. As previously mentioned, a connection, while physical, may not necessarily be tangible. Although computing device 2004 of FIG. 20 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 2022 may comprise any non-transitory storage mechanism. Memory 2022 may comprise, for example, primary memory 2024 and secondary memory 2026, additional memory circuits, mechanisms, or combinations thereof may be used. Memory 2022 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 2022 may be utilized to store a program of executable computer instructions. For example, processor 2020 may fetch executable instructions from memory and proceed to execute the fetched instructions. Memory 2022 may also comprise a memory controller for accessing device readable-medium 2040 that may carry and/or make accessible digital content, which may include code, and/or instructions, for example, executable by processor 2020 and/or some other device, such as a controller, as one example, capable of executing computer instructions, for example. Under direction of processor 2020, a non-transitory memory, such as memory cells storing physical states (e.g., memory states), comprising, for example, a program of executable computer instructions, may be executed by processor 2020 and able to generate signals to be communicated via a network, for example, as previously described. Generated signals may also be stored in memory, also previously suggested.

Memory 2022 may store electronic files and/or electronic documents, such as relating to one or more users, and may also comprise a computer-readable medium that may carry and/or make accessible content, including code and/or instructions, for example, executable by processor 2020 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 20, processor 2020 may comprise one or more circuits, such as digital circuits, to perform at least a portion of a computing procedure and/or process. By way of example, but not limitation, processor 2020 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 2020 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 20 also illustrates device 2004 as including a component 2032 operable with input/output devices, for example, so that signals and/or states may be appropriately communicated between devices, such as device 2004 and an input device and/or device 2004 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising:
   during a welding operation for a first seam of a first object, autonomously initiating, by a computing device, a first movement of a welding equipment assembly relative to one or more tracking points of the first object in accordance with one or more specified movement parameters as part of a calibration operation to adjust a subsequent movement of the welding equipment assembly during the welding operation for the first seam of the first object, wherein the welding equipment assembly comprises one or more wire feeders and one or more sensors;
   during the welding operation for the first seam of the first object, generating, by the computing device, one or more parameters representative of one or more predicted feature point locations on a first surface of the first object based at least in part on the one or more specified movement parameters;
   responsive at least in part to the first movement of the welding equipment assembly, electronically detecting, by the computing device during the welding operation for the first seam of the first object, an out-of-alignment condition for the welding equipment assembly, including obtaining image content from the one or more sensors to detect one or more feature points on the first surface of the first object and further including determining a difference between the one or more parameters representative of the one or more predicted feature point locations and one or more parameters representative of one or more detected feature points;
   determining, by the computing device during the welding operation for the first seam of the first object as part of the calibration operation, one or more calibration parameters based at least in part on the one or more parameters representative of the one or more detected feature points and based at least in part on the one or more specified movement parameters; and
   affecting the subsequent movement of the welding equipment assembly at least in part in accordance with the determined one or more calibration parameters.

2. The method of claim 1, wherein the one or more sensors comprise a camera, and wherein the welding equipment assembly further comprises a laser.

3. The method of claim 1, wherein the electronically detecting the out-of-alignment condition further comprises comparing the difference between the one or more parameters representative of the one or more predicted feature point locations and the one or more parameters representative of the one or more detected feature points with a specified threshold value.

4. The method of claim 1, further comprising generating or adjusting a second movement command for the subsequent movement of the welding equipment assembly during the welding operation for the first seam of the first object based at least in part on the one or more calibration parameters.

5. The method of claim 4, wherein the generating or adjusting the second movement command further comprises:
   obtaining second image content from a camera, wherein the second image content comprises content representative of a laser line projected onto the first surface of the first object and further comprises content representative of light pollution; and
   performing one or more filtering operations on the second image content to reduce light pollution.

6. The method of claim 5, wherein the performing the one or more filtering operations on the second image content includes performing an isolated blob filter operation.

7. The method of claim 5, wherein the performing the one or more filtering operations on the second image content includes performing a gaussian intensity distribution filter operation.

8. The method of claim 5, wherein the performing the one or more filtering operations on the second image content includes determining a line center corresponding to the laser line projected onto the first surface of the first object.

9. The method of claim 5, wherein the generating or adjusting the second movement command further comprises:
   calculating one or more geometric entities representative at least in part of the laser line projected onto the first surface of the first object based, at least in part, on the filtered second image content.

10. The method of claim 9, wherein the calculating the one or more geometric entities representative at least in part of the laser line projected onto the first surface of the first object includes identifying left and right zero planes representative at least in part of the first surface of the first object.

11. The method of claim 10, further including identifying a top surface representative, at least in part, of the first surface of the first object based, at least in part, on the left and right zero planes.

12. The method of claim 9, wherein the generating or adjusting the second movement command further comprises:
   generating or adjusting the second movement command based at least in part on the calculated one or more geometric entities.

13. The method of claim 12, further comprising:
   communicating the second movement command between the computing device and one or more microcontrollers; and
   the one or more microcontrollers transmitting one or more signals or signal pulses to one or more motors to implement the second movement command.

14. The method of claim 13, further comprising the one or more microcontrollers determining one or more characteristics of the one or more signals or signal pulses based, at least in part, on the second movement command.

15. The method of claim 14, wherein the determining the one or more characteristics of the one or more signals or signal pulses includes calculating timings for individual signals or signal pulses for the one or more motors.

16. The method of claim 15, wherein the calculating the timings for the individual signals or signal pulses for the one or more motors includes calculating timings based at least in part on specified parameters for velocity, acceleration or deceleration, or any combination thereof.

17. A system, comprising:
a welding equipment assembly comprising one or more wire feeders and one or more sensors; and
a computing device to:
initiate, during a welding operation for a first seam of a first object, a first movement of the welding equipment assembly in accordance with one or more specified movement parameters as part of a calibration operation to adjust a subsequent movement of the welding equipment assembly;
during the welding operation for the first seam of the first object, generate one or more parameters representative of one or more predicted feature point locations on a first surface of the first object based at least in part on the one or more specified movement parameters;
responsive at least in part to the first movement of the welding equipment assembly, detect an out-of-alignment condition for the welding equipment assembly during the welding operation for the first seam of the first object, wherein, to detect the out-of-alignment condition, the computing device to:
obtain image content from the one or more sensors to detect one or more feature points on the first surface of the first object; and
determine a difference between the one or more parameters representative of the one or more predicted feature point locations and one or more parameters representative of one or more detected feature points; and
determine, during the welding operation for the first seam of the first object, one or more calibration parameters for the calibration operation based at least in part on the one or more parameters representative of the one or more detected feature points and based at least in part on the one or more specified movement parameters; and
affect the subsequent movement of the welding equipment assembly at least in part in accordance with the determined one or more calibration parameters.

18. The system of claim 17, wherein the computing device further to generate or adjust a second movement command for the subsequent movement of the welding equipment assembly during the welding operation for the first seam of the first object based at least in part on the one or more calibration parameters, wherein, to generate or adjust the second movement command, the computing device further to:
obtain second image content from the one or more sensors, wherein the second image content to comprise content representative of a laser line projected onto the first surface of the first object and further to comprise content representative of light pollution;
perform one or more filtering operations on the second image content to reduce light pollution;
calculate one or more geometric entities representative at least in part of the laser line projected onto the first surface of the first object based, at least in part, on the filtered second image content; and
initiate communication of the second movement command between the computing device and one or more microcontrollers, wherein the one or more microcontrollers to transmit one or more signals or signal pulses to one or more motors to implement the second movement command.

* * * * *